US006577027B2

(12) United States Patent
Hayase et al.

(10) Patent No.: US 6,577,027 B2
(45) Date of Patent: Jun. 10, 2003

(54) ELECTRICAL EQUIPMENT WINDING STRUCTURE PROVIDING IMPROVED COOLING FLUID FLOW

(75) Inventors: Gaku Hayase, Tokyo (JP); Satoru Kotoh, Tokyo (JP); Akihiro Unemi, Tokyo (JP); Takashi Hoshino, Tokyo (JP); Yuta Ichinose, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/766,676

(22) Filed: Jan. 23, 2001

(65) Prior Publication Data

US 2002/0024262 A1 Feb. 28, 2002

(30) Foreign Application Priority Data

Aug. 29, 2000 (JP) .................................... 2000-259142

(51) Int. Cl.[7] ........................ H02K 9/00; H02K 1/32; H02K 3/24; H02K 5/18; H02K 5/20; H01F 27/08

(52) U.S. Cl. ......................... 310/59; 310/52; 310/54; 310/58; 310/65

(58) Field of Search ......................... 310/59, 52, 58, 310/64, 65, 60 R; 62/259.2; 165/166, 80.4, 104.33; 361/689, 699; 336/60

(56) References Cited

U.S. PATENT DOCUMENTS

| | | | | |
|---|---|---|---|---|
| 3,902,146 A | * | 8/1975 | Muralidharan | 336/57 |
| 4,000,482 A | * | 12/1976 | Staub et al. | 336/60 |
| 4,028,653 A | * | 6/1977 | Carlsson et al. | 336/60 |
| 4,207,550 A | * | 6/1980 | Daikoku et al. | 336/60 |
| 4,245,206 A | * | 1/1981 | Daikoku et al. | 336/185 |
| 4,264,834 A | * | 4/1981 | Armor et al. | 310/55 |
| 4,346,361 A | * | 8/1982 | Sauer | 336/60 |
| 4,363,012 A | * | 12/1982 | Daikoku et al. | 336/185 |
| 4,864,172 A | * | 9/1989 | Dobt | 310/59 |
| 5,296,829 A | * | 3/1994 | Kothmann et al. | 336/185 |
| 6,097,116 A | * | 8/2000 | Hess et al. | 310/58 |

FOREIGN PATENT DOCUMENTS

| | | | |
|---|---|---|---|
| EP | 785 560 | | 7/1997 |
| JP | 55-22870 | | 2/1980 |
| JP | 355022870 A | * | 2/1980 |
| JP | 55-145026 | | 11/1980 |
| JP | 401313913 A | * | 12/1989 |
| JP | 9-293617 | | 11/1997 |
| JP | 409293617 A | * | 11/1997 |

* cited by examiner

*Primary Examiner*—Nestor Ramirez
*Assistant Examiner*—Julio C. Gonzalez
(74) *Attorney, Agent, or Firm*—Leydig, Voit & Mayer, Ltd.

(57) ABSTRACT

A winding structure of induction electric apparatus cooling disc windings within a cooling block evenly. With respect to a pair of cooling blocks including a cooling block A disposed upstream of axial insulating cylinder cooling flow of a blocking plate blocking a vertical cooling passage and another cooling block A disposed downstream of the axial insulating cylinder cooling flow of the blocking plate, a vertical guide cooling passage splits an outer vertical cooling passage into two parts. The vertical guide cooling passage includes a side face of the disc windings and a flow passage adjusting guide plate with the flow passage adjusting guide plate placed along the circumference of the disc windings with two ends facing the disc winding side, surrounding the disc windings disposed upstream of the axial insulating cylinder cooling flow of the blocking plate and the disc windings disposed downstream of the axial insulating cylinder cooling flow of the blocking plate.

19 Claims, 30 Drawing Sheets

I-I Sectional view

J-J Sectional view

ELECTRICAL EQUIPMENT WINDING STRUCTURE PROVIDING IMPROVED COOLING FLUID FLOW

BACKGROUND OF THE INVENTION

1. Technical Field

The present invention relates to a winding structure of induction electric apparatus such as transformer, reactor or the like. The invention relates, more particularly, to a winding structure of induction electric apparatus in which a large number of disc windings are stacked inside an insulating cylinder, and an insulating and cooling fluid is circulated either in the form of forced circulation or natural convection, thereby providing cooling.

2. Background Art

Prior Art 1

Generally, stationary induction electric apparatus such as transformers and reactors consist of an iron core serving as a passage for magnetic flux, a pair of windings serving as a passage for electrical current that interlinks with magnetic flux, an insulator for insulation between the windings, and a clamping device for maintaining their mutual position and withstanding mechanical force. One of the commonly used winding structures in this type of stationary induction electric apparatus involves the use of disc windings. FIG. 33 is a plan view showing a part of a conventional winding structure of induction electric apparatus. FIG. 34 is a sectional view of winding structure of induction electric apparatus shown in FIG. 33 taken along the line XXXIV—XXXIV. As shown in FIGS. 33 and 34, a plurality of unit disc windings 3 of disc shape, comprised of conductors wound around radially between an inner insulating cylinder 1 and an outer insulating cylinder 2, are stacked in axial direction. The horizontal cooling passages 5 are formed in radial direction of the disc winding 3 through the radial placement of a plurality of horizontal spacers 4 each at a regular interval between one disc winding 3 and another.

An inner vertical cooling passage 8 is formed by providing inner vertical spacers 6 between the inner insulating cylinder 1 and the inner periphery side of the disc winding 3. An outer vertical cooling passage 9 is formed by providing outer vertical spacers 7 between the outer insulating cylinder 2 and the outer periphery side of the disc winding 3. As shown in FIG. 34, an inner blocking plate 10 and an outer blocking plate 11 are placed on the inner insulating cylinder 1 and the outer insulating cylinder 2 at every plural layers of the disc winding 3, so as to form one cooling block A for every plural horizontal cooling passages 5. The inner blocking plate 10 blocks the inner vertical cooling passage 8, and the outer blocking plate 11 blocks the outer vertical cooling passage 9. The inner blocking plate 10 and the outer blocking plate 11 are alternately placed in the axial direction of the insulating cylinder along the whole circumference.

The disc windings 3 in winding structure of induction electric apparatus with the mentioned construction are cooled by either forcibly taking in the insulating and cooling fluids from the bottom, or by taking in the insulating and cooling fluids through natural convection. However, since the inlet A1 and the outlet A2 for the cooling fluids of each cooling block A are alternately reversed between the inside and outside for each cooling block, the cooling fluid that flows through the horizontal cooling passages 5 of each cooling block rises while alternately changing from one direction to the other at each cooling block to cool the disc windings 3 in each cooling block. Note that the flow of the cooling fluid from the bottom (i.e., flow at the upstream end) is indicated by the arrow A3, and the flow towards the top (i.e., flow at the downstream end) indicated by the arrow A4.

Prior Art 2

FIG. 35 is a sectional view showing a cooling construction of the winding structure of induction electric apparatus disclosed in the Japanese Patent publication (unexamined) No. Hei. 9-293617, which is a winding structure of induction electric apparatus having the mentioned construction shown in FIGS. 33 and 34. As shown in FIG. 35, an insulating plate 31 for adjusting inner passage flow (hereinafter referred to as "inner flow passage adjustment insulating plate") is placed along the whole or part of the circumference of the horizontal cooling passage 5 in each cooling block when the blocking plate downstream the cooling flow in the cooling block is the inner blocking plate 10. In addition, when the blocking plate downstream the cooling flow in the cooling block is the outer blocking plate 11, an insulating plate 32 for adjusting the outer flow passage (hereinafter referred to as "outer flow passage adjustment insulating plate") is placed along the whole or part of the circumference of the horizontal cooling passage 5 in each cooling block.

The inner vertical cooling passage 8 is made narrower in some parts by having the mentioned inner flow passage adjustment insulating plate 31 protrude partially into the inner vertical cooling passage 8. In addition, the outer vertical cooling passage 9 is also made narrower in some parts by having the mentioned outer flow passage adjustment insulating plate 32 protrude partially into the outer vertical cooling passage 9. This restricts the flow rate of cooling fluid flowing into the horizontal cooling passages 5 downstream the cooling flow in each cooling block, and increases the quantity of cooling fluid flowing into the horizontal cooling passages 5 upstream the cooling flow in each cooling block.

Prior Art 3

FIG. 36 is a sectional view showing a cooling construction of the winding structure of induction electric apparatus disclosed in the Japanese Patent publication (unexamined) No. Hei. 9-293617. This is a winding structure of induction electric apparatus having the mentioned construction shown in FIGS. 33 and 34. As shown in FIG. 36, when the inner blocking plate 10 is the blocking plate downstream of the cooling flow in the cooling block, an inner flow passage adjustment insulator 33 is placed in each cooling block on the side face of the disc winding 3 on the inner vertical cooling passage 8 side, for either the whole or part of the circumference. In addition, when the outer blocking plate 11 is the blocking plate downstream of the cooling flow in the cooling block, an outer flow passage adjustment insulator 34 is placed in each cooling block on the side face of the disc winding 3 on the outer vertical cooling passage 9 side, for either the whole or part of the circumference.

The mentioned inner flow passage adjustment insulator 33 makes the inner vertical cooling passage 8 narrower in some parts, and the mentioned outer flow passage adjustment insulator 34 makes the outer vertical cooling passage 9 narrower in some parts. This restricts the quantity of cooling fluid flowing into the horizontal cooling passages 5 downstream of the cooling flow in each cooling block, and increases the quantity of cooling fluid flowing into the horizontal cooling passages 5 upstream of the cooling flow in each cooling block.

Prior Art 4

FIG. 37 is a sectional view showing the cooling construction of the winding structure of induction electric apparatus disclosed in the Japanese Patent publication (unexamined)

No. Hei. 9-293617. This is a winding structure of induction electric apparatus having the mentioned construction shown in FIGS. 33 and 34. As shown in FIG. 37, when the blocking plate downstream of the cooling flow in the cooling block is the inner blocking plate 10, an inner flow passage adjustment insulator 35 is placed in each cooling block on the surface of the inner insulating cylinder 1 on the inner vertical cooling passage 8 side, for either the whole or part of the circumference. In addition, when the blocking plate downstream of the cooling flow in the cooling block is the outer blocking plate 11, an outer flow passage adjustment insulator 36 is placed in each cooling block on the surface of the outer insulating cylinder 2 on the outer vertical cooling passage 9 side, for either the whole or part of the circumference.

The mentioned inner flow passage adjustment insulator 35 gradually makes the cross sectional area of the inner vertical cooling passage 8 smaller as it goes further downstream of the cooling flow. In addition, the mentioned outer flow passage adjustment insulator 36 gradually makes the cross sectional area of the outer vertical cooling passage 9 smaller as it goes further downstream of the cooling flow. This restricts the quantity of cooling fluid flowing into the horizontal cooling passages 5 downstream of the cooling flow in each cooling block, and increases the quantity of cooling fluid flowing into the horizontal cooling passages 5 upstream of the cooling flow in each cooling block.

Prior Art 5

FIG. 38 is a sectional view showing the cooling construction of the winding structure of induction electric apparatus disclosed in the Japanese Patent publication (unexamined) No. Sho. 55-22870. This is a winding structure of induction electric apparatus having the mentioned construction shown in FIGS. 33 and 34. As shown in FIG. 38, when the blocking plate downstream of the cooling flow in the cooling block is the inner blocking plate 10, an outer flow passage adjustment insulating plate 38 is placed in each cooling block on the side face of the disc winding 3 on the outer vertical cooling passage 9 side, for either the whole or part of the circumference. In addition, when the blocking plate downstream of the cooling flow in the cooling block is the outer blocking plate 11, an inner flow passage adjustment insulating plate 37 is placed in each cooling block on the side face of the disc winding 3 on the inner vertical cooling passage 8 side, for either the whole or part of the circumference.

The mentioned inner flow passage adjustment insulating plate 37 splits the inner vertical cooling passage 8 into two parts in radial direction, while the mentioned outer flow passage adjustment insulating plate 38 splits the outer vertical cooling passage 9 into two parts in radial direction. The amount of cooling fluid that flows into the horizontal cooling passages 5 is adjusted by regulating the length of the mentioned inner flow passage adjustment insulating plate 37 and the mentioned outer flow passage adjustment insulating plate 38 in the axial direction of the insulating cylinder, and by adjusting the radial length of the mentioned inner flow passage adjustment insulating plate 37 and the mentioned outer flow passage adjustment insulating plate 38.

In the winding structure of induction electric apparatus with the mentioned construction such as shown in FIGS. 33 and 34, flow velocity of the cooling fluid in the horizontal cooling passage 5 near the inlet of each cooling block is extremely small as compared with the flow velocity of the cooling fluid in the horizontal cooling passage 5 near the outlet of each cooling block. When the flow velocity of the cooling fluid that is split into each horizontal cooling passage 5 in every cooling block is indicated by the arrows 12, of which length is proportional to the flow velocity, the distribution will become uneven, as shown in FIG. 34. When the flow velocity is uneven in this way, the cooling effect is extremely small for the disc winding 3 placed near the inlet as compared with the cooling effect for the disc winding 3 placed near the outlet.

One of the means of solution to the mentioned problem (P) is to arrange a cooling construction in which the inner blocking plate 10 and the outer blocking plate 11 are placed alternately for each disc winding 3 so that the cooling fluid may rise while alternately changing direction between inside and outside. However, placing a large number of inner blocking plates 10 and outer blocking plates 11 will lead to lower cooling efficiency due to the increased resistance to the flow of the cooling fluid in the winding structure of induction electric apparatus as a whole. It will also lead to an increase in manufacturing cost.

Another means of solution to the mentioned problem (P) is shown in FIG. 35, in which an inner flow passage adjustment insulating plate 31 is placed in each cooling block along the whole or part of the circumference of the horizontal cooling passage 5 when the blocking plate downstream of the cooling flow in the cooling block is the inner blocking plate 10. In addition, when the blocking plate downstream of the cooling flow in the cooling block is the outer blocking plate 11, an outer flow passage adjustment insulating plate 32 is placed along the whole or part of the circumference of the horizontal cooling passage 5 in each cooling block. However, when the cooling fluid flows into either each of the horizontal cooling passages 5 surrounded by the said inner blocking plate 10 and the said inner flow passage adjustment insulating plate 31, or each of the horizontal flow passages 5 surrounded by the said outer blocking plate 11 and the outer flow passage adjustment insulating plate 32, then the flow velocity of the cooling fluid becomes uneven. This is because the flow velocity is determined by the balance of the pressure loss in parallel flow passages. In addition, the inner vertical cooling passage 8 and the outer vertical cooling passage 9 becomes narrower in some parts due to the inner flow passage adjustment insulating plate 31 and the outer flow passage adjustment insulating plate 32 respectively. This leads to a decrease in the total flow quantity of the cooling fluid that passes through these parts due to the increase in the flow resistance, which, in turn, leads to lower cooling efficiency.

A further means of solution to the mentioned problem (P) is shown in FIG. 36, in which an inner flow passage adjustment insulator 33 is placed in each cooling block on the side face of the disc winding 3 on the inner vertical cooling passage 8 side along either the whole or part of the circumference, when the inner blocking plate 10 is the blocking plate downstream of the cooling flow in the cooling block. In addition, when the blocking plate downstream of the cooling flow in the cooling block is the outer blocking plate 11, an outer flow passage adjustment insulator 34 is placed in each cooling block on the side face of the disc winding 3 on the outer vertical cooling passage 9 side, along either the whole or part of the circumference. However, when the cooling fluid flows into either each of the horizontal cooling passages 5 between the mentioned inner blocking plate 10 and the mentioned inner flow passage adjustment insulator 33, or each of the horizontal flow passages 5 between the mentioned outer blocking plate 11 and the outer flow passage adjustment insulator 34, the flow velocity of the cooling fluid becomes uneven. This is because the flow velocity is determined by the balance of the pressure loss in parallel flow passages. In addition, the inner vertical cooling passage 8 and the outer vertical cooling passage 9 becomes narrower in some parts due to the inner flow passage adjustment insulator 33 and the outer flow passage adjustment insulator 34 respectively. This leads to a decrease in the total flow quantity of the cooling fluid that passes through these parts due to the increase in the flow resistance, which, in turn, leads to lower cooling efficiency.

A still further means of solution to the mentioned problem (P) is shown in FIG. 37, in which when the blocking plate downstream of the cooling flow in the cooling block is the inner blocking plate 10, an inner flow passage adjustment insulator 35 is placed in each cooling block on the surface of the inner insulating cylinder 1 on the inner vertical cooling passage 8 side along either the whole or part of the circumference. In addition, when the outer blocking plate 11 is the blocking plate downstream of the cooling flow in the cooling block, an outer flow passage adjustment insulator 36 is placed in each cooling block on the surface of the outer insulating cylinder 2 on the outer vertical cooling passage 9 side along either the whole or part of the circumference. However, the inner vertical cooling passage 8 or the outer vertical cooling passage 9 becomes gradually narrower as they go further downstream due to the mentioned inner flow passage adjustment insulator 35 and the mentioned outer flow passage adjustment insulator 36 respectively. This leads to increased flow resistance to the cooling fluid that passes through these parts. This reduces the total flow quantity of fluid, leading to lower cooling efficiency. Moreover, this also leads to increased manufacturing cost. Furthermore, a yet further means of solution to the mentioned problem (P) is shown in FIG. 38, in which when the inner blocking plate 10 is the blocking plate downstream of the cooling flow in the cooling block, an outer flow passage adjustment insulating plate 38 is placed in each cooling block on the side face of the disc winding 3 on the outer vertical cooling passage 9 side along either the whole or part of the circumference. In addition, when the outer blocking plate 11 is the blocking plate downstream of the cooling flow in the cooling block, an inner flow passage adjustment insulating plate 37 is placed in each cooling block on the side face of the disc winding 3 on the inner vertical cooling passage 8 side, for either whole or part of the circumference. However, when the cooling fluid flows into each of the horizontal cooling passages 5 surrounded by the mentioned inner blocking plate 10 and the mentioned disc winding 3 in which the mentioned outer flow passage adjustment insulating plate 38 is placed, and into each of the horizontal flow passages 5 surrounded by the mentioned outer blocking plate 11 and the mentioned disc winding 3 in which the mentioned inner flow passage adjustment insulating plate 37 is placed, the flow velocity of the cooling fluid becomes uneven. This is because the flow velocity is determined by the balance of the pressure loss in parallel flow passages. In addition, the outer vertical cooling passage 9 and the inner vertical cooling passage 8 becomes narrower in some parts due to, respectively, the mentioned outer flow passage adjustment insulating plate 38 and the mentioned inner flow passage adjustment insulating plate 37. This leads to a decrease in the total flow quantity of the cooling fluid due to the increase in the flow resistance, which, in turn, leads to lower cooling efficiency. This is shown in FIG. 38 as indicated by the arrows 12, of which length is proportional to the flow velocity of the cooling fluid in each horizontal cooling passage 5 in every cooling block. It is understood from FIG. 38 that the flow velocity distribution of the cooling fluid split into each horizontal cooling passage 5 is uneven.

SUMMARY OF THE INVENTION

The present invention was made to solve the above-discussed problems incidental to the prior arts. Accordingly, a principal object of the invention is to provide a winding structure of induction electric apparatus capable of restraining reduction in cooling efficiency caused by the reduced flow quantity of the cooling fluid due to increased flow resistance of the cooling fluid, and cooling more evenly plural disc windings in a cooling block.

A winding structure of induction electric apparatus according to the invention comprises: an inner insulating cylinder; an outer insulating cylinder disposed coaxially on the outside of the inner insulating cylinder; plural layers of disc windings which are stacked in an axial direction between the mentioned inner insulating cylinder and the mentioned outer insulating cylinder; horizontal cooling passages formed by spaces between each of the mentioned disc windings; an inner vertical cooling passage formed by a space between an inner peripheral side surface of the mentioned disc winding and the mentioned inner insulating cylinder; and an outer vertical cooling passage formed by a space between an outer peripheral side surface of the mentioned disc windings and the mentioned outer insulating cylinder; and in which one cooling block is formed at each of the mentioned plural layers of disc windings by alternately arranging an inner blocking plate to block the mentioned inner vertical cooling passage and an outer blocking plate to block the mentioned outer vertical cooling passage at each of the mentioned plural layers of disc windings, and cooling fluid flows upwardly from bottom side of the mentioned cooling block to top side; wherein, with respect to at least one pair of cooling blocks between a pair of cooling blocks comprising a cooling block disposed upstream of the axial insulating cylinder cooling flow of the inner blocking plate and another cooling block disposed downstream of the axial insulating cylinder cooling flow of the mentioned inner locking plate and another pair of cooling blocks comprising cooling block disposed upstream of the axial insulating cylinder cooling flow of the outer blocking plate and another cooling block disposed downstream of the axial insulating cylinder cooling flow of the mentioned outer blocking plate, an outer vertical guide cooling passage splitting the mentioned outer vertical cooling passage into two parts is formed with an outer peripheral side face of the mentioned disc windings and an outer flow passage adjusting guide plate by placing the mentioned outer flow passage adjusting guide plate along either the whole or part of the circumference of the disc windings with their two ends facing to the mentioned disc winding side in such a manner as to surround the plural disc windings disposed upstream of the axial insulating cylinder cooling flow of the mentioned inner blocking plate and the plural disc windings disposed downstream of the axial insulating cylinder cooling flow of the mentioned inner blocking plate, when the inner blocking plate serves as a blocking plate; and an inner vertical guide cooling passage splitting the mentioned inner vertical cooling passage into two parts is formed with an inner peripheral side face of the mentioned disc windings and an inner flow passage adjusting guide plate by placing the mentioned inner flow passage adjusting guide plate along either the whole or part of the circumference of the disc windings with their two ends facing to the mentioned disc winding side in such a manner as to surround the plural disc windings disposed upstream of the axial insulating cylinder cooling flow of the mentioned outer blocking plate and the plural disc windings disposed downstream of the axial insulating cylinder cooling flow of the mentioned outer blocking plate, when the outer blocking plate serves as a blocking plate.

By arranging the winding structure as described above, the cooling fluid in the horizontal cooling passage near the outlet of the cooling flow in the cooling block with a relatively large flow velocity is forcibly made to flow to the horizontal cooling passage near the inlet of the cooling flow in the cooling block disposed downstream of the axial insulating cylinder cooling flow of either the inner blocking plate or the outer blocking plate, where the flow velocity of the cooling fluid is relatively smaller. This operation is performed by at least either one of the inner vertical guide cooling passage comprised of the inner peripheral side face of the disc windings and the inner flow passage adjusting guide plate, or the outer vertical guide cooling passage comprised of the outer peripheral side face of the disc winding and the outer flow passage adjusting guide plate. As a result, the relatively slow flow velocity of the cooling fluid of the cooling flow in the cooling block is increased in the mentioned horizontal cooling passage near the inlet of the cooling flow. The flow velocity distribution of the cooling fluid distributed into each horizontal cooling passage can thus be made more even for each passage, thereby achieving a cooling effect that is the same for each passage within the cooling block. Further, the decrease in the cooling efficiency caused by the reduced flow quantity due to increased flow resistance to the cooling fluid is restricted, making it possible for each of the plural disc winding in the cooling block to be cooled evenly.

It is preferable that, in the winding structure of induction electric apparatus according to the invention, with respect to a pair of cooling block comprised of the cooling block disposed upstream of the axial insulating cylinder cooling flow of the blocking plate and the cooling block disposed downstream of the axial insulating cylinder cooling flow of the mentioned blocking plate, number of plural disc windings disposed upstream of the axial insulating cylinder cooling flow of the mentioned blocking plate and number of plural disc windings disposed downstream of the axial insulating cylinder cooling flow of the mentioned blocking plate, the disc windings being surrounded by the flow passage adjusting guide plate, are established to be same.

By this arrangement, number of disc windings disposed upstream of axial insulating cylinder cooling flow of the blocking plate and that of disc windings disposed downstream of the axial insulating cylinder cooling flow of the mentioned blocking plate, which are both surrounded by the flow passage adjusting guide plate, are adjusted to be a desired same number, when there is an uneven temperature distribution in the cooling block due to difference in height of the horizontal cooling passages, etc., or when there is an uneven temperature distribution due to uneven heat generation by each disc winding, etc. As a result, a desirable flow velocity distribution of the cooling fluid is attained within the cooling block, resulting in the same and even cooling effect.

It is preferable that, in the winding structure of induction electric apparatus according to the invention, with respect to a pair of cooling block comprised of the cooling block disposed upstream of the axial insulating cylinder cooling flow of the blocking plate and the cooling block disposed downstream of the axial insulating cylinder cooling flow of the mentioned blocking plate, number of plural disc windings disposed upstream of the axial insulating cylinder cooling flow of the mentioned blocking plate and number of plural disc windings disposed downstream of the axial insulating cylinder cooling flow of the mentioned blocking plate, the disc windings being surrounded by the flow passage adjusting guide plate, are established to be different.

By this arrangement, number of disc windings disposed upstream of axial insulating cylinder cooling flow of the blocking plate and that of disc windings disposed downstream of the axial insulating cylinder cooling flow of the mentioned blocking plate, the disc windings being surrounded by the flow passage adjusting guide plate, are desirably adjusted to be different, when there is an uneven temperature distribution in the cooling block due to difference in height of the horizontal cooling passages, etc., or when there is an uneven temperature distribution due to uneven heat generation by each disc winding, etc. As a result, a desirable flow velocity distribution of the cooling fluid is attained within the cooling block, resulting in the same and even cooling effect.

It is preferable that, in the winding structure of induction electric apparatus according to the invention, the flow passage adjusting guide plate is disposed between adjacent cooling blocks downstream of the axial insulating cylinder cooling flow.

By this arrangement, temperature of the disc windings will get higher in further downstream of the axial insulating cylinder cooling flow, because temperature of the cooling fluid is raised in further downstream of the axial insulating cylinder cooling flow. The flow quantity of the cooling flow can be made more even in each horizontal cooling passage of the cooling block that contains the disc windings of the higher temperature at the point furthest downstream of the axial insulating cylinder cooling flow. Moreover, the manufacturing cost can be saved, as there is only a small number of guide plates.

It is preferable that, in the winding structure of induction electric apparatus according to the invention, the flow passage adjusting guide plate is divided into two parts, a guide plate for the upstream cooling flow and a guide plate for the downstream cooling flow, and an end of the mentioned upstream guide plate is faced to the disc winding side and the mentioned downstream guide plate is faced to the disc winding side.

By dividing the guide plate in this manner, the workability is improved, and the manufacturing cost is saved.

It is preferable that, in the winding structure of induction electric apparatus according to the invention, the flow passage adjusting guide plate is divided into three parts, a guide plate for the upstream cooling flow, a central guide plate, and a guide plate for the downstream cooling flow, and an end of the mentioned upstream guide plate is faced to the disc winding side, and the mentioned downstream guide plate is faced to the disc winding side.

By dividing the guide plate in this manner, the workability is improved, and the manufacturing cost is saved.

It is preferable that, in the winding structure of induction electric apparatus according to the invention, the horizontal cooling passage between the disc windings is horizontally split into two parts at the end part facing the disc winding side of the flow passage adjusting guide plate.

By this arrangement, uniform cooling is achieved without lowering the cooling efficiency of the disc windings.

It is preferable that, in the winding structure of induction electric apparatus according to the invention, the end part facing the disc winding of the flow passage adjusting guide plate is placed on the peripheral side face of the disc windings.

By this arrangement, fixing construction of the guide plate is simplified, and the workability in fitting the guide plate is improved.

It is preferable that, in the winding structure of induction electric apparatus according to the invention, the end part upstream of the cooling flow facing the disc winding side of the flow passage adjusting guide plate is placed on the face of the disc winding side downstream of the cooling flow, and the end part downstream of the cooling flow is placed on the face of the disc winding side upstream of the cooling flow.

By this arrangement, fixing construction of the guide plate is simplified, and the workability in fitting the guide plate is improved.

It is preferable that, in the winding structure of induction electric apparatus according to the invention, the end part upstream of the cooling flow facing the disc winding side of the flow passage adjusting guide plate is placed on the face of the disc winding side upstream of the cooling flow, and the end part downstream of the cooling flow is placed on the face of the disc winding side downstream of the cooling flow.

By this arrangement, fixing construction of the guide plate is simplified, and the workability in fitting the guide plate is improved.

It is preferable that, in the winding structure of induction electric apparatus according to the invention, a bent portion facing the disc winding side of the flow passage adjusting guide plate is curved in order to reduce flow resistance of the cooling flow.

By this arrangement, the resistance of the flow of the cooling fluid passing through the vertical guide cooling passage is reduced, making it possible to increase the total flow quantity of the cooling fluid.

It is preferable that, in the winding structure of induction electric apparatus according to the invention, the flow passage adjusting guide plate is formed as an elongated single plate so as to be placed continuously between the horizontal spacers between the disc windings in the circumferential direction of the disc windings.

By this arrangement, number of guide plate parts to be placed can be reduced, as well as reducing man-hours expended in fitting them.

It is preferable that, in the winding structure of induction electric apparatus according to the invention, the flow passage adjusting guide plate is divided in three parts, the upstream cooling flow guide plate, the central guide plate, and the downstream cooling flow guide plate, and an end of the mentioned upstream guide plate is faced to the disc winding side and the mentioned downstream guide plate is faced towards the disc winding side, while the mentioned central guide plate is formed of a flexible sheet extending along the peripheral side face of the disc windings.

By this arrangement, workability in fitting the central guide plate can be improved.

A further winding structure of induction electric apparatus according to the invention comprises: an inner insulating cylinder; an outer insulating cylinder disposed coaxially on the outside of the inner insulating cylinder; plural layers of disc windings which are stacked in an axial direction between the mentioned inner insulating cylinder and the mentioned outer insulating cylinder; horizontal cooling passages formed by spaces between each of the mentioned disc windings; an inner vertical cooling passage formed by a space between an inner peripheral side surface of the mentioned disc winding and the mentioned inner insulating cylinder; and an outer vertical cooling passage formed by a space between an outer peripheral side surface of the mentioned disc windings and the mentioned outer insulating cylinder; and in which one cooling block is formed at each of the mentioned plural layers of disc windings by alternately arranging an inner blocking plate to block the mentioned inner vertical cooling passage and an outer blocking plate to block the mentioned outer vertical cooling passage at each of the mentioned plural layers of disc windings, and cooling fluid flows upwardly from bottom side of the mentioned cooling block to top side; wherein, with respect to at least one pair of cooling blocks between a pair of cooling blocks comprising a cooling block disposed upstream of the axial insulating cylinder cooling flow of the inner blocking plate and another cooling block disposed downstream of the axial insulating cylinder cooling flow of the mentioned inner blocking plate and another pair of cooling blocks comprising a cooling block disposed upstream of the axial insulating cylinder cooling flow of the outer blocking plate and another cooling block disposed downstream of the axial insulating cylinder cooling flow of the mentioned outer blocking plate, an outer vertical guide cooling passage splitting the mentioned outer vertical cooling passage into two parts is formed with an outer peripheral side face of the mentioned disc windings and an outer flow passage adjusting guide plate by placing the mentioned outer flow passage adjusting guide plate along the circumference of the disc windings with their two ends facing to the mentioned disc winding side in such a manner as to surround the plural disc windings disposed upstream of the axial insulating cylinder cooling flow of the mentioned inner blocking plate and the plural disc windings disposed downstream of the axial insulating cylinder cooling flow of the mentioned inner blocking plate, when the inner blocking plate serves as a blocking plate, and an inner vertical guide cooling passage splitting the mentioned inner vertical cooling passage into two parts is formed with an inner peripheral side face of the mentioned disc windings and an inner flow passage adjusting guide plate by placing the mentioned inner flow passage adjusting guide plate along the circumference of the disc windings with their two ends facing to the mentioned disc winding side in such a manner as to surround the plural disc windings disposed upstream of the axial insulating cylinder cooling flow of the mentioned inner blocking plate and the plural disc windings disposed downstream of the axial insulating cylinder cooling flow of the mentioned outer blocking plate, when the outer blocking plate serves as a blocking plate.

By arranging the winding structure as described above, the cooling fluid in the horizontal cooling passage near the outlet of the cooling flow in the cooling block with a relatively large flow velocity is forcibly made to flow to the horizontal cooling passage near the inlet of the cooling flow in the cooling block disposed downstream of the axial insulating cylinder cooling flow of either the inner blocking plate or the outer blocking plate, where the flow velocity of the cooling fluid is relatively smaller. This operation is performed by the inner vertical guide cooling passage comprised of the inner peripheral side face of the disc windings and the inner flow passage adjusting guide plate, and by the outer vertical guide cooling passage comprised of the outer peripheral side face of the disc winding and the outer flow passage adjusting guide plate. As a result, the relatively slow flow velocity of the cooling fluid of the cooling flow in the cooling block is increased in the mentioned horizontal cooling passage near the inlet of the cooling flow. The flow velocity distribution of the cooling fluid distributed into each horizontal cooling passage can thus be made more even for each passage, thereby achieving a cooling effect that is the same for each passage within the cooling block. Further, the decrease in the cooling efficiency caused by the reduced flow quantity due to increased flow resistance to the cooling fluid is restricted, making it possible for each of the plural disc winding in the cooling block to be cooled evenly.

DESCRIPTION OF THE PREFERRED EMBODIMENTS

Embodiment 1

Figure 1:
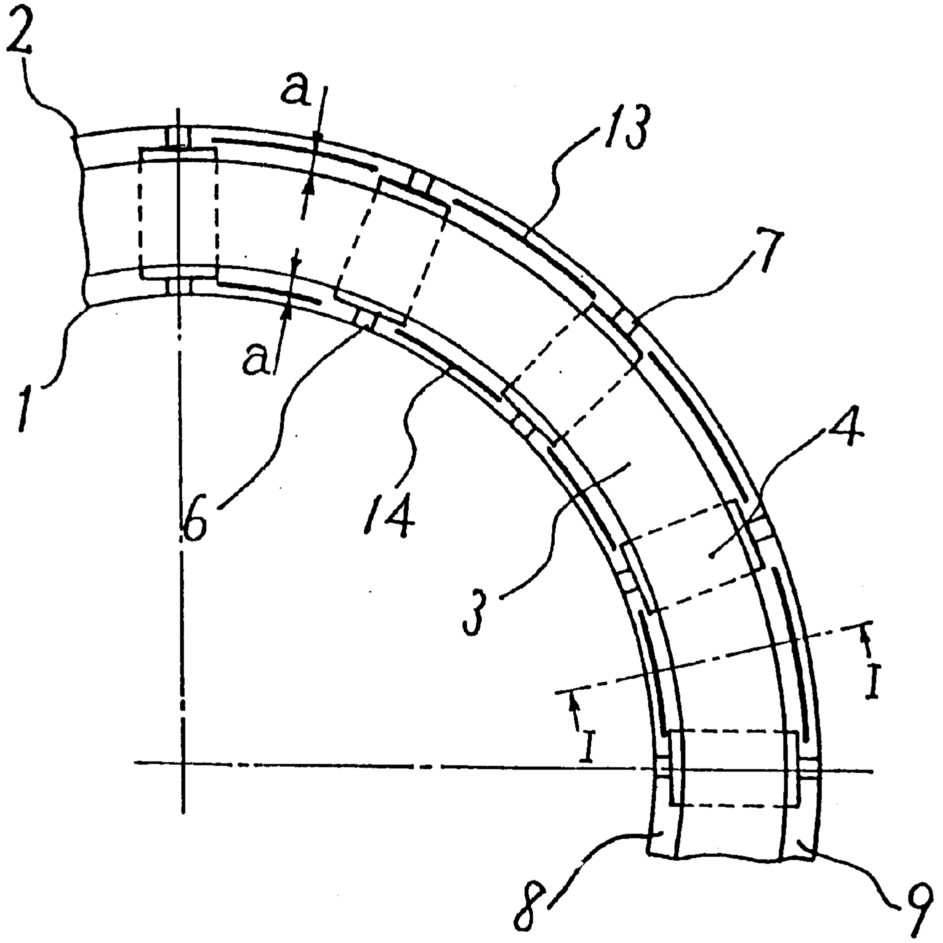
FIG. 1 is a plan view of a winding structure of induction electric apparatus according to Embodiment 1 of the present invention.
Figure 2:
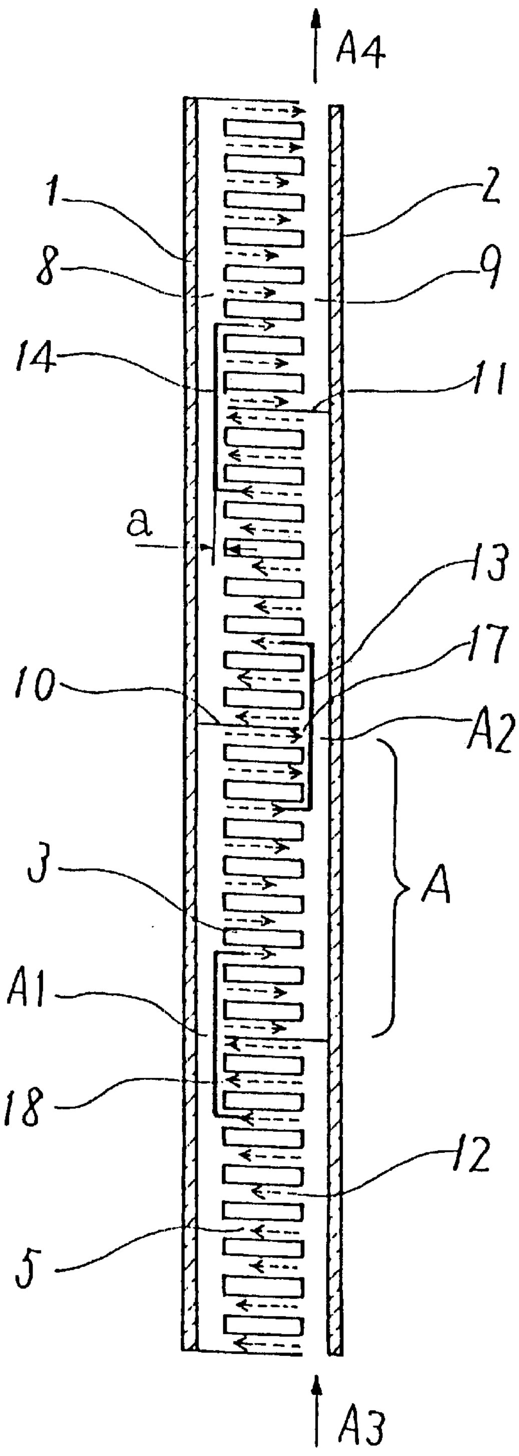
FIG. 2 is a sectional view showing the winding structure of induction electric apparatus in FIG. 1 taken along the line II—II.

FIG. 1 is a plan view showing a part of a winding structure of induction electric apparatus according to Embodiment 1 of the present invention. FIG. 2 shows a sectional view of the winding structure of induction electric apparatus in FIG. 1 taken along the line II-II.

Plural disc windings 3 are stacked in an axial direction between the inner insulating cylinder 1 and the outer insulating cylinder 2. Thus, plural horizontal cooling passages 5 are formed by spaces between the disc windings 3. The inner vertical flow passage 8 is formed by the inner insulating cylinder 1 and the disc winding 3, while the outer vertical cooling passage 9 is formed by the outer insulating cylinder 2 and the disc winding 3. Horizontal spacers 4 are inserted into each horizontal cooling passage 5 to maintain the gaps. In addition, the space between the disc winding and the inner insulating cylinder 1 that comprises the inner vertical cooling passage 8 is maintained by the inner vertical spacer 6, while the space between the disc winding and the outer insulating cylinder 2 that comprises the outer vertical cooling passage 9 is maintained by the outer vertical spacer 7. One cooling block A is formed at every plural horizontal cooling passages 5 along the whole circumference by alternately placing an inner blocking plate 10, for blocking the inner vertical cooling passage 8, and an outer blocking plate 11, for blocking the outer vertical cooling passage, at every plural layers of the disc winding 3 in the axial direction of the insulating cylinder.

With respect to one pair of cooling blocks disposed upstream and downstream of the axial insulating cylinder cooling flow of the inner blocking plate 10 and another pair of cooling blocks disposed upstream and downstream of the axial insulating cylinder cooling flow of the outer blocking plate 11, an outer vertical guide cooling passage 17 is formed with an outer peripheral side face of the disc windings 3 and an outer flow passage adjusting guide plate 13 by placing the outer flow passage adjusting guide plate 13 along the whole circumference of the disc windings with their two ends facing to the disc winding 3 side in such a manner as to surround the plural disc windings 3 (two disc windings in FIG. 2) disposed upstream of the axial insulating cylinder cooling flow of the inner blocking plate 10 and the plural disc windings disposed downstream of the axial insulating cylinder cooling flow of the mentioned inner blocking plate 10, when the inner blocking plate 10 serves as a blocking plate, and an inner vertical guide cooling passage 18 is formed with an inner peripheral side face of the disc windings 3 and an inner flow passage adjusting guide plate 14 by placing the inner flow passage adjusting guide plate 14 along the whole circumference of the disc windings 3. with their two ends facing to the disc winding 3 side in such a manner as to surround the plural disc windings 3 (two disc windings in FIG. 2) disposed downstream of the axial insulating cylinder cooling flow of the outer blocking plate 11 and the plural disc windings 3 disposed downstream of the axial insulating cylinder cooling flow of the outer blocking plate 11, when the outer blocking plate 11 serves as a blocking plate.

The end of the outer flow passage adjusting guide plate 13 and the end of the inner flow passage adjusting guide plate 14 upstream and downstream of the cooling f low are respectively bent towards the disc winding 3 side. The horizontal cooling passages 5 are split into two parts by inserting each tip of the ends of the inner and outer flow passage adjusting guide plates into the horizontal cooling passages 5 formed out of the spaces between the disc windings 3. Further, by splitting the outer vertical cooling passage 9 and the inner vertical cooling passage 8 into two parts in the radial direction with the outer flow passage adjusting guide plate 13 and the inner flow passage adjusting guide plate 14, the outer vertical guide cooling passage 17 parallel to the outer vertical cooling passage 9 and the inner vertical guide cooling passage 18 parallel to the inner vertical cooling passage 8 are respectively formed.

Number of disc windings 3 placed upstream and downstream of the axial insulating cylinder cooling flow of either the inner blocking plate 10 surrounded by the outer flow passage adjusting guide plate 13 or the outer blocking plate 11 surrounded by the inner flow passage adjusting guide plate 14 is adjusted to correspond to the number of disc windings 3 in each cooling block or to the height of each horizontal cooling passage 5 (axial length of the insulating cylinder) in each cooling block, etc. In addition, flow division ratio of the outer vertical guide cooling passage 17 with respect to the outer vertical cooling passage 9 split into two parts in the radial direction by the outer flow passage adjusting guide plate 13, or flow division ratio of the inner vertical guide cooling passage 18 with respect to the inner vertical cooling passage 8 split into two parts by the inner flow passage adjusting guide plate 14, are adjusted through dimension 'a' so as to correspond to the number of disc winding 3 in each cooling block, or to the height of each horizontal cooling passage 5 of each cooling block, etc.

Note that flow of the cooling fluid from the bottom (flow at the upstream end), and flow to the top (flow at the downstream end), are respectively indicated by the arrow A3 and the arrow A4. Reference numeral A1 is an inlet of the cooling fluid into cooling block A, and numeral A2 is an outlet out of cooling block A.

In this Embodiment 1 of mentioned arrangement, the insulating and cooling fluid is made to flow in between the inner insulating cylinder 1 and the outer insulating cylinder 2 from the bottom end of FIG. 2, either forcibly, or by natural convection. The fluid then flows through to the top. With respect to the pair of cooling blocks upstream and downstream of the axial insulating cylinder cooling flow of the inner blocking plate 10, the outer vertical guide cooling passage 17 is formed with the disc winding 3 and the outer flow passage adjusting guide plate 13. This is done by placing the outer flow passage adjusting guide plate 13 along the whole circumference in such a manner as to surround the plural disc windings 3 disposed upstream of the axial insulating cylinder cooling flow of the inner blocking plate 10 and the plural disc windings 3 disposed downstream of the axial insulating cylinder cooling flow of the inner blocking plate 10. Thus, the cooling fluid near the outlet of the cooling flow with a relatively fast flow velocity within the cooling block placed upstream of the axial insulating cylinder cooling flow of the inner blocking plate 10, can be made to flow directly towards the horizontal cooling passage 5 near the inlet where the flow velocity of the cooling fluid is relatively slow within the cooling block placed downstream of the axial insulating cylinder cooling flow of the inner blocking plate 10. For this reason, the flow velocity of the cooling fluid in the horizontal cooling passage 5 near the inlet of each cooling block is increased, and the flow velocity distribution of the cooling fluid split into each horizontal cooling passage 5 can be evened and uniformed.

Furthermore, with respect to the pair of cooling blocks upstream and downstream of the axial insulating cylinder cooling flow of the inner blocking plate 11, the inner vertical guide cooling passage 18 is formed with the disc winding 3 and the outer flow passage adjusting guide plate 13. This is done by placing the inner flow passage adjusting guide plate 14 along the whole circumference in such a manner as to surround the plural disc windings 3 disposed upstream of the axial insulating cylinder cooling flow of the outer blocking plate 11 and the plural disc windings 3 disposed downstream of the axial insulating cylinder cooling flow of the outer blocking plate 11. Thus, the cooling fluid near the outlet of the cooling flow with a relatively fast flow velocity within the cooling block placed upstream of the axial insulating cylinder cooling flow of the outer blocking plate 11, can be made to flow directly towards the horizontal cooling passage 5 near the inlet where the flow velocity of the cooling fluid is relatively slow within the cooling block placed downstream of the axial insulating cylinder cooling flow of the outer blocking plate 11. For this reason, the flow velocity of the cooling fluid in the horizontal cooling passage 5 near the inlet of each cooling block is increased, and the flow velocity distribution of the cooling fluid split into each horizontal cooling passage 5 can be evened and uniformed.

Thus, the flow velocity distribution will be evened or uniformed as indicated by the arrow 12 in FIG. 2. Note that length of the arrow 12 is proportional to the flow velocity of the cooling fluid in order to show the flow velocity of the cooling fluid split into each horizontal cooling passage 5 in each cooling block.

Figure 3:
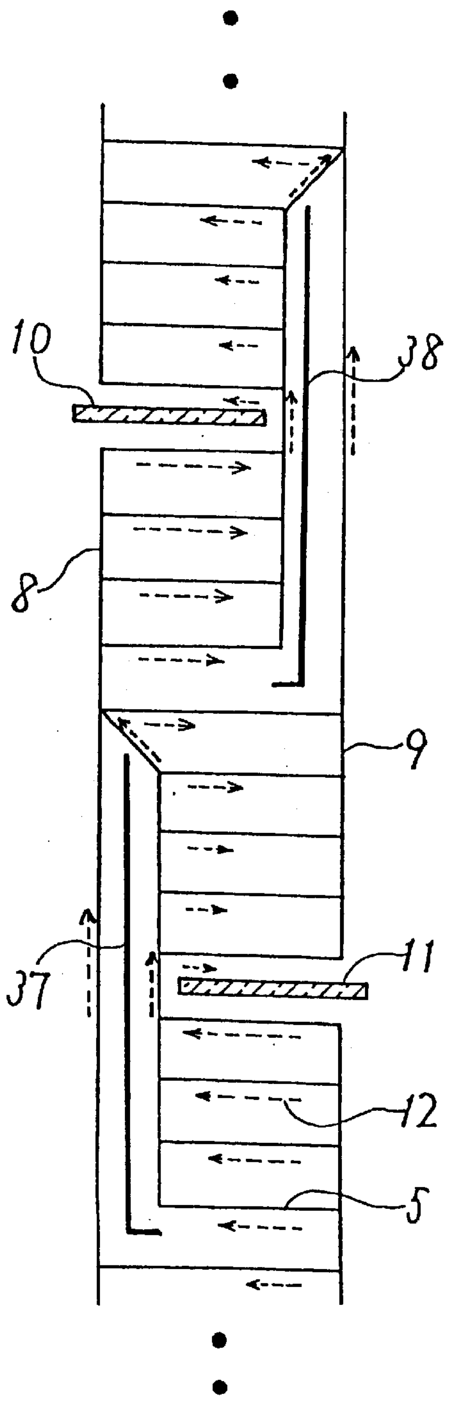
Fig. 3 PRIOR ART
FIG. 3 is a schematic view showing the flow of the cooling fluid in FIG. 38.
Figure 38:
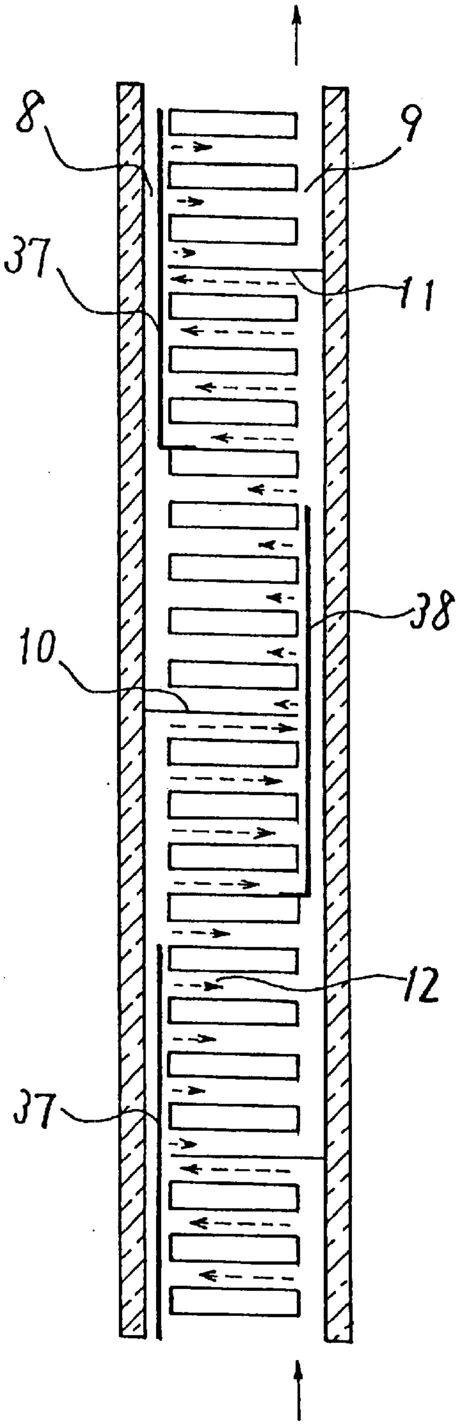
Fig. 38 PRIOR ART
FIG. 38 is the sectional view of a yet further winding structure of induction electric apparatus according to a prior art.

The reason why the flow of the cooling fluid in the present invention is more uniform than the flow of the cooling fluid in the conventional winding structure of induction electric apparatus, such as that shown in FIG. 38, can be explained as follows. FIG. 3 is a schematic drawing showing the flow of the cooling fluid in FIG. 38. Although in FIG. 38 the cooling fluid is split by the inner and outer flow passage adjusting insulating plates 37 and 38, because of the additional function of increasing the flow velocity due to the division of the flow, it becomes harder for the cooling fluid to be diverted into each horizontal cooling passage 5 downstream of the inner and outer locking plates 10 and 11 (near the inlet of the cooling block placed downstream of the axial insulating cylinder cooling flow of the inner and outer blocking plates 10 and 11). Moreover, in this prior art, the overall pressure loss increases due to the establishment of the inner and outer flow passage adjusting insulating plates 37 and 38 in the flow passages. The result of this is that the effect of evening or uniforming the flow of the cooling fluid is either the same as that in the conventional distribution shown in FIG. 34 or less than that.

Figure 4:
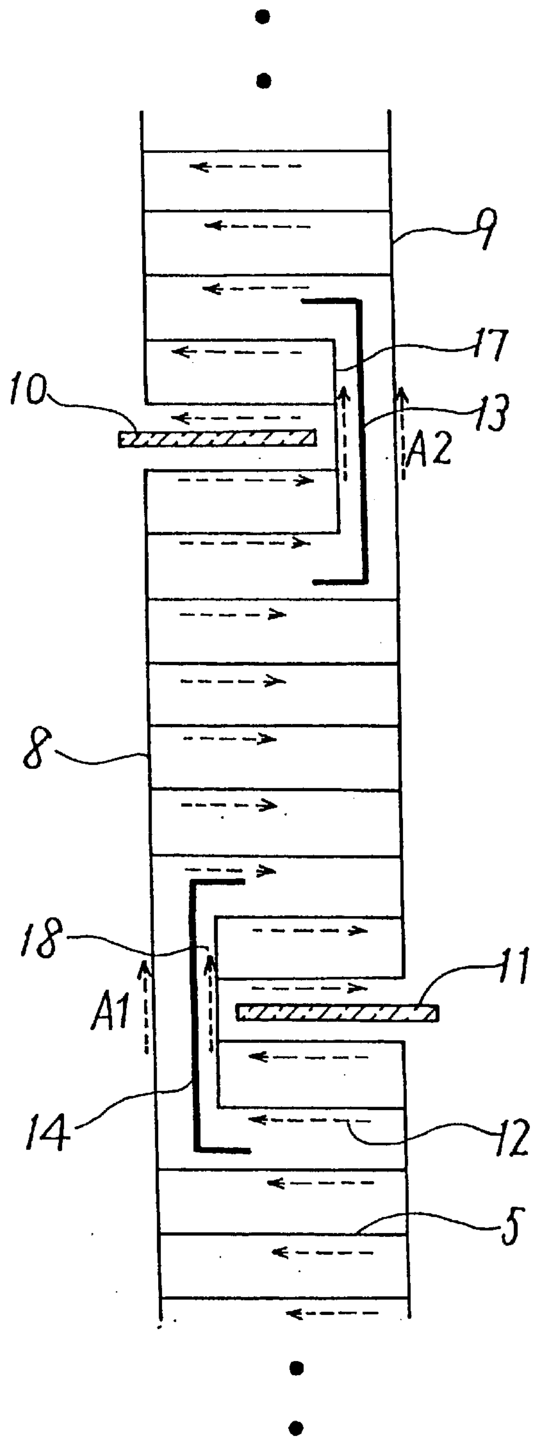
FIG. 4 is a schematic view showing the flow of the cooling fluid in FIG. 2.

On the other hand, FIG. 4 is a schematic drawing showing the flow of the cooling fluid in the winding structure of induction electric apparatus according to the invention in FIG. 2. In this Embodiment 1 of the invention, the cooling fluid is not only split by the inner and outer flow passage adjusting guide plates 14 and 13 in FIG. 2, but also is forcibly diverted to each horizontal flow passage 5 downstream of the inner and outer blocking plates 10 and 11 (near the inlet of the cooling block placed downstream of the axial insulating cylinder cooling flow of the inner and outer blocking plates 10 and 11). Furthermore, by arranging the flow passages in parallel, it becomes possible to reduce the overall pressure loss (in other words, the confluence loss and the diversion loss that are the main causes of resistance to the flow of cooling fluid is reduced).

Figure 5:
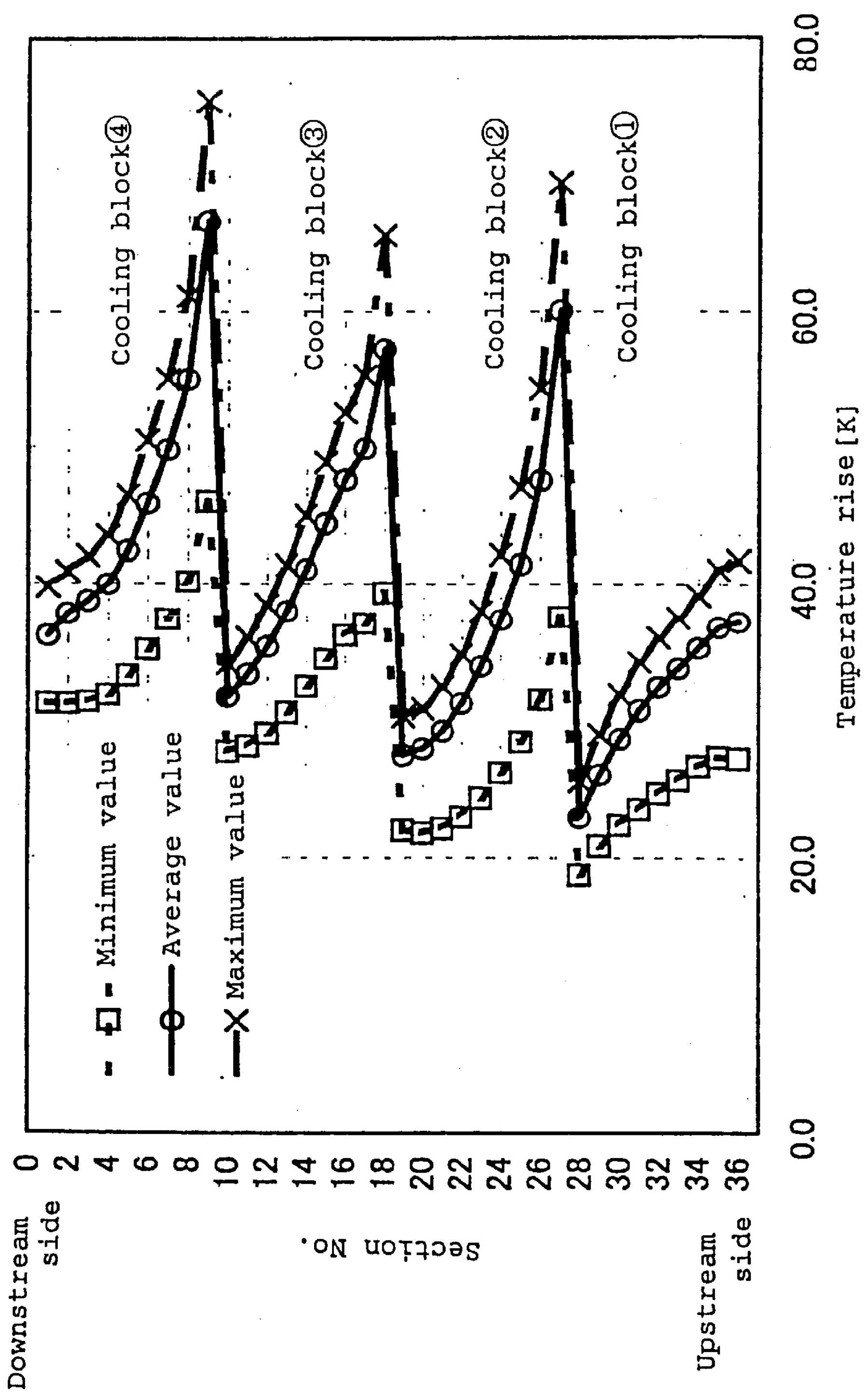
Fig. 5 PRIOR ART
FIG. 5 is a temperature distribution chart for a winding structure of induction electric apparatus according to one of the prior arts.
Figure 6:
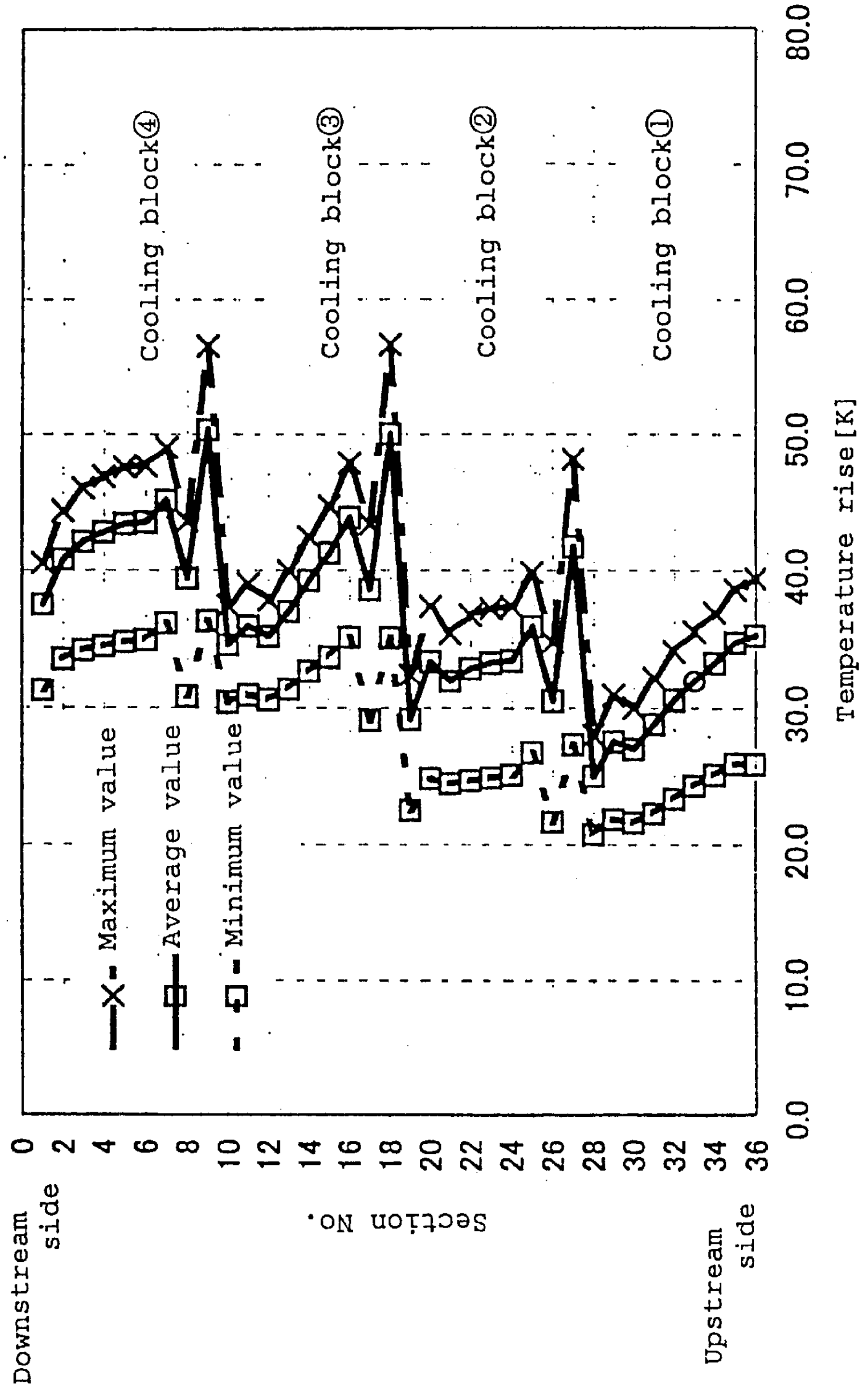
FIG. 6 is a temperature distribution chart for a winding structure of induction electric apparatus according to the invention.
Figure 34:
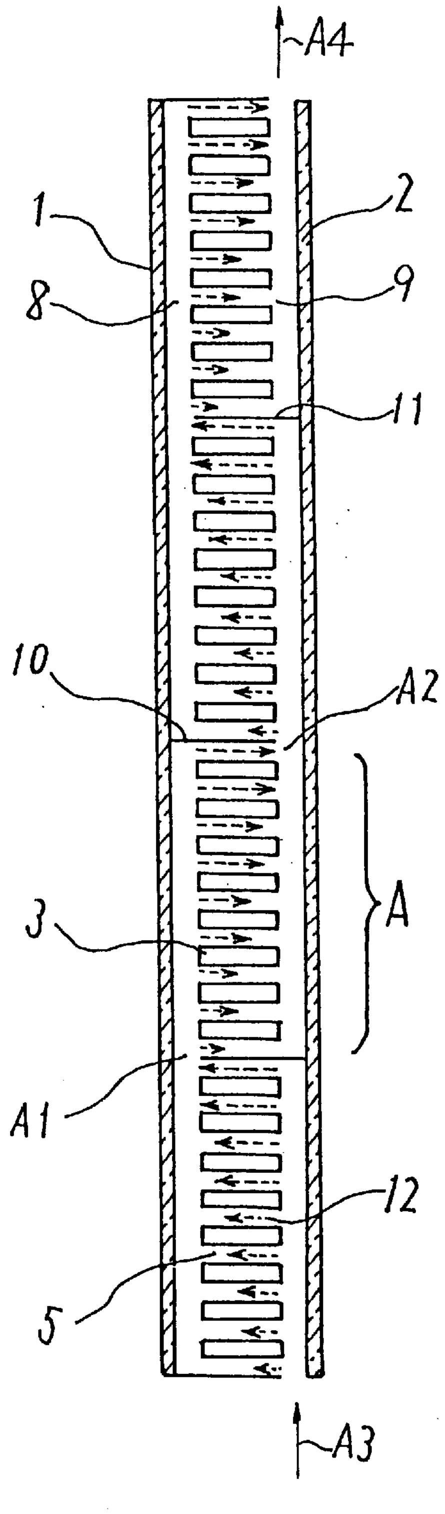
Fig 34 PRIOR ART
FIG. 34 is a sectional view of the winding structure of induction electric apparatus shown in FIG. 3 taken along the line XXXIV—XXXIV.
Figure 35:
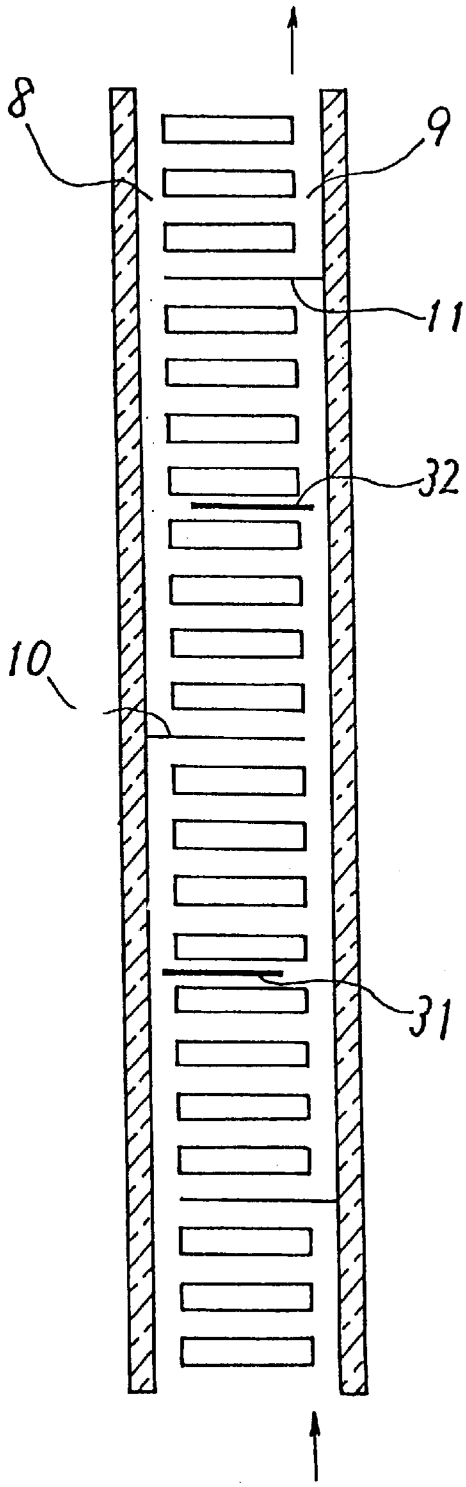
Fig. 35 PRIOR ART
FIG. 35 is a sectional view of another winding structure of induction electric apparatus according to a prior art.
Figure 36:
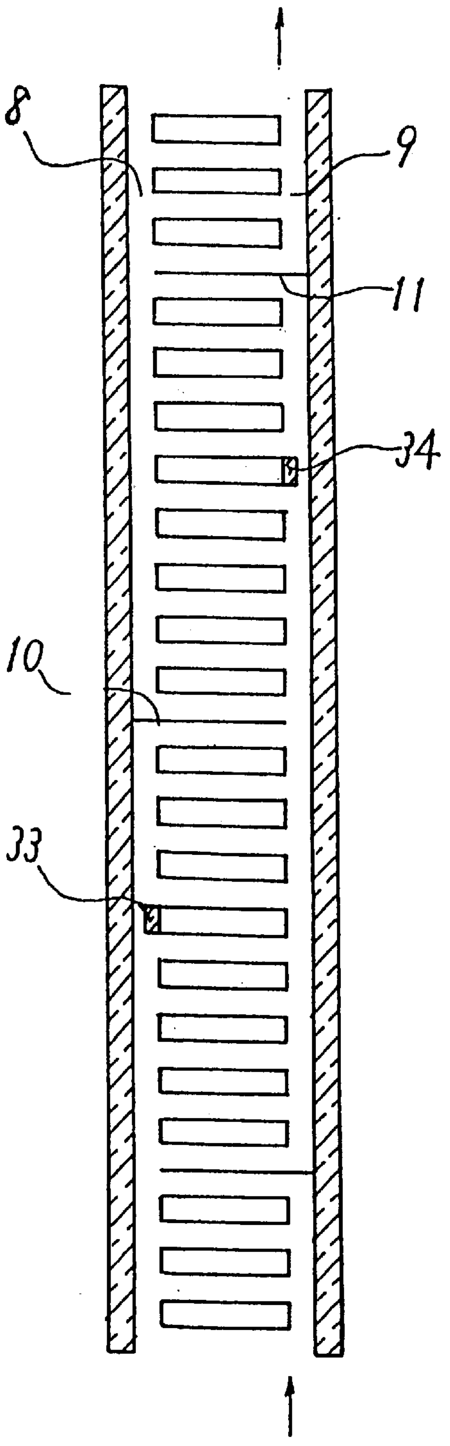
Fig. 36 PRIOR ART
FIG. 36 is a sectional view of a further winding structure induction electric apparatus according to a prior art.
Figure 37:
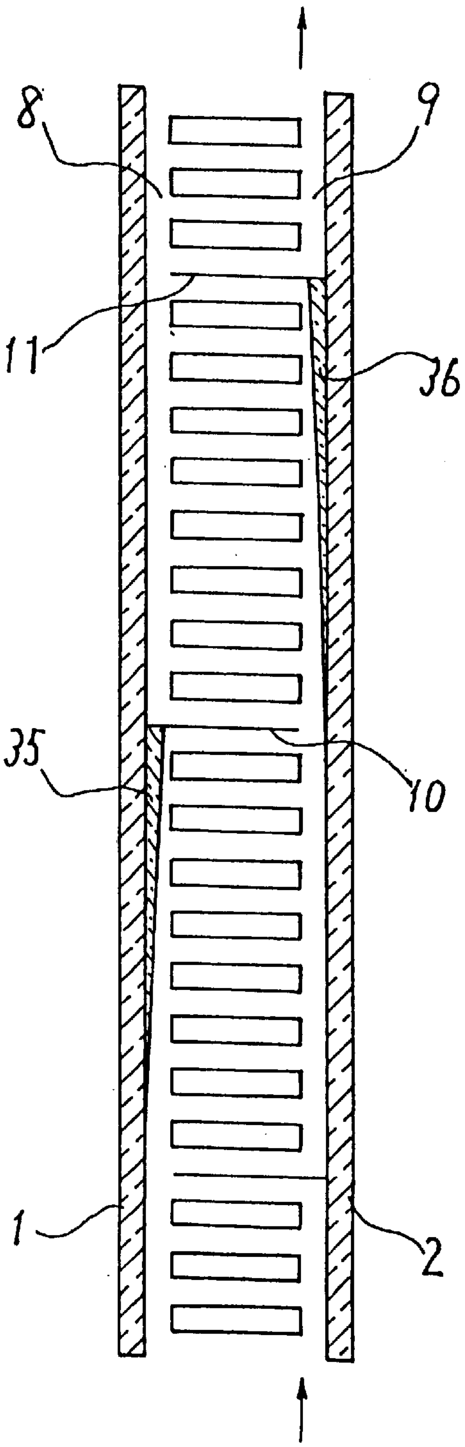
Fig. 37 PRIOR ART
FIG. 37 is a sectional view of a still further winding structure of induction electric apparatus according to a prior art.

Shown in FIG. 5 is temperature distribution in the conventional winding structure of induction electric apparatus shown in FIG. 34. Shown in FIG. 6 is temperature distribution in the winding structure of induction electric apparatus according to Embodiment 1 of the invention. In these drawings, the axis of ordinates plots the number (section No.) of the disc winding, and the axis of abscissas plots the temperature rise [K]. Going from upstream to downstream, the cooling block numbers are affixed from (1) to (4). Since the flow quantity in each horizontal cooling passage 5 in each cooling block can be made even in this Embodiment 1, conspicuous temperature rises in just one specific disc winding 3 is prevented. A uniform cooling effect, that is, an improvement in cooling efficiency is achieved, enabling the average temperature of each disc winding 3 to be lowered. As a result, when capacity [KVA] is the same, cross sectional area of the conductor can be made smaller. This makes it possible to create small-sized and lightweight transformers and reactors, etc.

Embodiment 2

Figure 7:
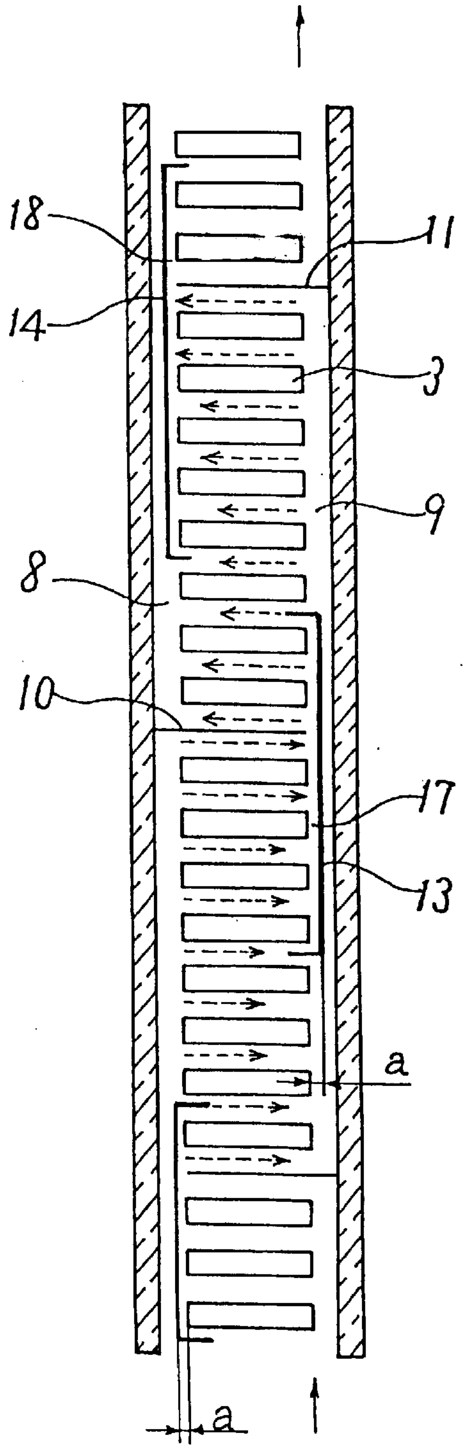
FIG. 7 is a sectional view showing a winding structure of induction electric apparatus according to Embodiment 2 of the invention.

FIG. 7 is a sectional view showing a winding structure of induction electric apparatus according to Embodiment 2 of the invention. Note that description of features, operations and advantages of this Embodiment that are the same as those in the foregoing Embodiment 1 is omitted herein.

The outer vertical guide cooling passage 17 and the inner vertical guide cooling passage 18 are formed by splitting the outer vertical cooling passage 9 and the inner vertical cooling passage 8 into two in a radial direction. This is done by placing the outer flow passage adjusting guide plate 13 and the inner flow passage adjusting guide plate 14 along the whole circumference in such a manner as to surround the disc windings 3 disposed downstream of the axial insulating cylinder cooling flow of the inner blocking plate 10 and the outer blocking plate 11, and the plural disc windings 3, of either the same or different numbers, disposed upstream of the axial insulating cylinder cooling flow of the inner blocking plate 10 and the outer blocking plate 11. Depending on the situation, it is also preferable to surround the disc windings 3 disposed downstream of the axial insulating cylinder cooling flow of the inner blocking plate 10 and the outer blocking plate 11 that is greater in number than the disc windings 3 disposed upstream of the axial insulating cylinder cooling flow of the inner blocking plate 10 and the outer blocking plate 11. The number of disc windings 3 surrounded by either the outer flow passage adjusting guide plate 13 or the inner flow passage adjusting guide plate 14 disposed upstream and downstream of the axial insulating cylinder cooling flow of the inner blocking plate 10 or the outer blocking plate 11 can be adjusted as desired. In addition, either the flow division ratio of the outer vertical guide cooling passage 17 with respect to the outer vertical cooling passage 9, or the flow division ratio of the inner vertical guide cooling passage 18 with respect to the inner vertical cooling passage 8 can be adjusted through the dimension ‘a’.

This Embodiment 2 of the invention allows the number of disc windings 3 surrounded by the outer flow passage adjusting guide plate 13 and the inner flow passage adjusting guide plate 14 in the foregoing Embodiment 1 to be adjusted as desired. As a result, when there is an uneven flow quantity distribution due to differences in the dimensions of the horizontal cooling passages 5, etc. in each cooling block, flow rate in each horizontal cooling passage 5 within each cooling block can be made even or uniform through the same operation as in the foregoing Embodiment 1 of the invention. In addition, if an uneven generation of heat is generated at the disc winding 3 in each cooling block, the flow rate can be increased in each horizontal cooling passage adjacent to the disc winding 3 generating a large amount of heat, while the flow rate of the cooling flow in each horizontal cooling passage in contact with the disc winding 3 generating a small amount of heat can be reduced.

The same advantages achieved in the foregoing Embodiment 1 of the invention at each cooling block downstream of the cooling flow of the outer flow passage adjusting guide plate 13 and the inner flow passage adjusting guide plate 14 can be also achieved in this Embodiment 2.

Embodiment 3

Figure 8:
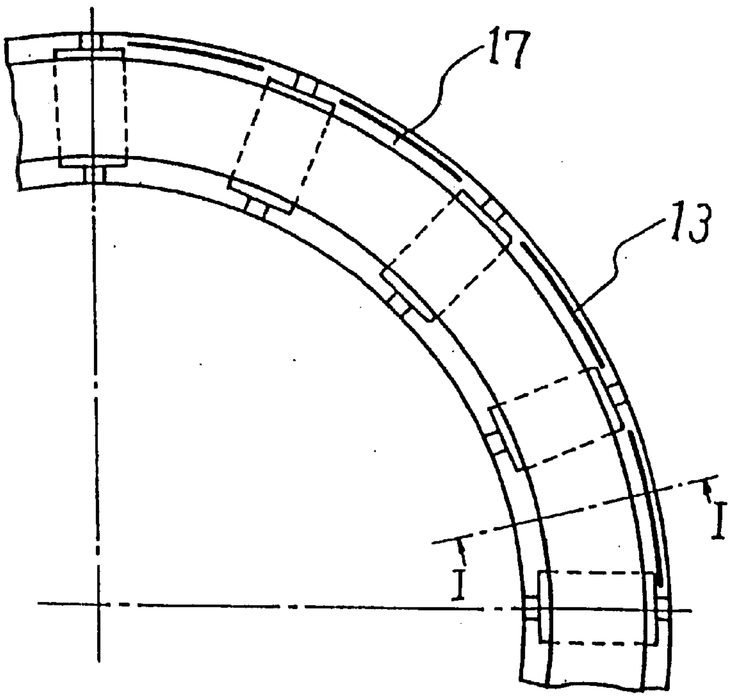
FIG. 8 is a plan view of a winding structure of induction electric apparatus according to Embodiment 3 of the invention.
Figure 9:
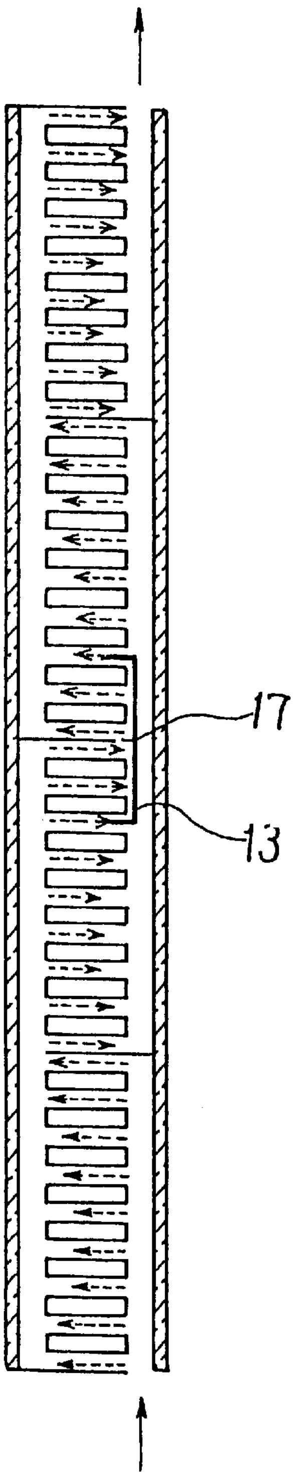
FIG. 9 is a sectional view showing the winding structure of induction electric apparatus in FIG. 8 taken along the line IX—IX.

FIG. 8 is a plan view of a part of the winding structure of induction electric apparatus according to Embodiment 3 of the invention. FIG. 9 is a sectional view showing the winding structure of induction electric apparatus in FIG. 8 taken along the line IX—IX. Note that description of features, operations and advantages of this Embodiment that are the same as those in the foregoing Embodiment 1 is omitted herein.

The outer vertical guide cooling passage 17 parallel to the outer vertical cooling passage 9 is formed by splitting the horizontal cooling passage 5 and the outer vertical cooling passage 9 into two parts with the outer flow passage adjusting guide plate 13. This is done by placing the outer flow passage adjusting guide plate 13 along the whole circumference. The horizontal cooling passage 5 concerned is split into two parts through the insertion of both ends of the outer flow passage adjusting guide plate 13.

This Embodiment 3 provides an arrangement in which, in terms of the foregoing Embodiment 1 and Embodiment 2, only the outer flow passage adjusting guide plate 13 is placed. As compared with the foregoing Embodiment 1, problems that may arise in fabricating this winding structure of induction electric apparatus are reduced due to reasons concerning the placement and arrangement of the iron core, windings, and insulators. In addition, as number of guide plates used is small, increase in the manufacturing cost can be restrained. Flow rate of the cooling flow in each horizontal cooling passage 5 within each cooling block downstream of the cooling flow of the outer flow passage adjusting guide plate 13 can be evened and uniformed for each passage through the same operation as in the foregoing Embodiment 1.

The same advantages achieved in the foregoing Embodiment 1 within each cooling block downstream of the cooling flow of the outer flow passage adjusting guide plate 13 can be also achieved in this Embodiment 3.

Embodiment 4

Figure 10:
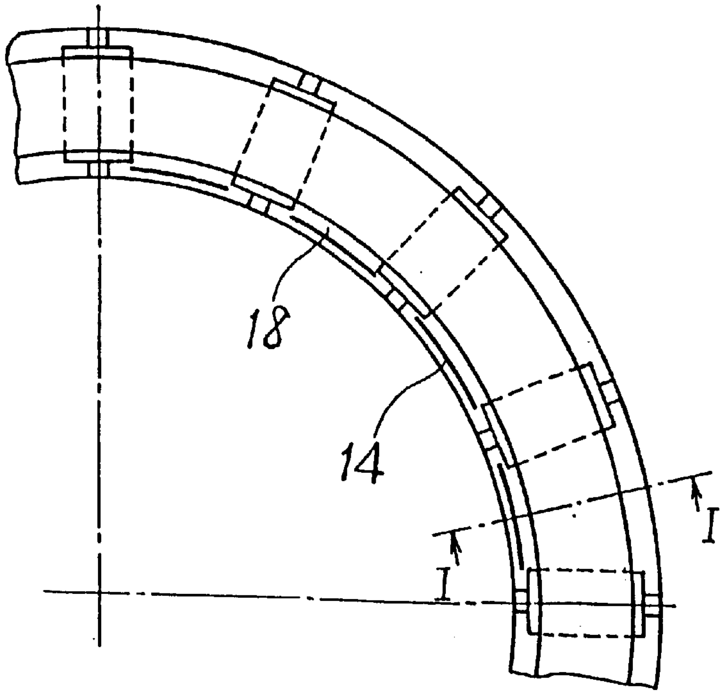
FIG. 10 is a plan view of a winding structure of induction electric apparatus according to Embodiment 4 of the invention.
Figure 11:
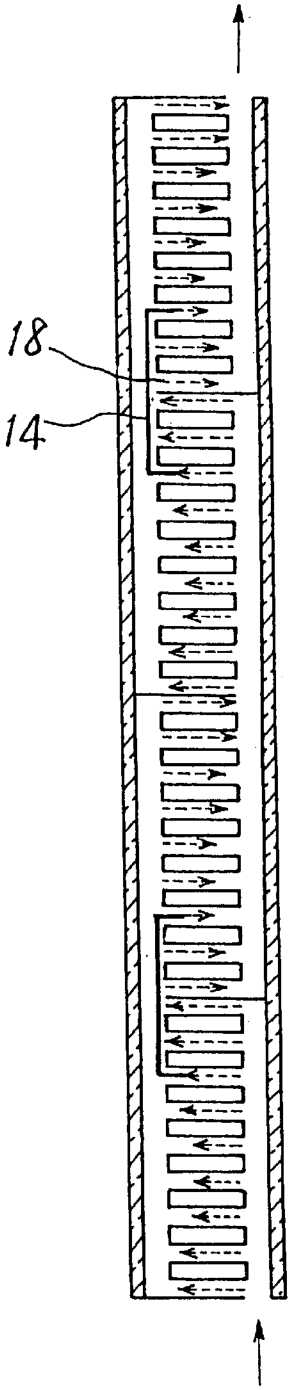
FIG. 11 is a sectional view showing the winding structure of induction electric apparatus in FIG. 10 taken along the line XI—XI.

FIG. 10 is a plan view showing a part of a winding structure of induction electric apparatus according to Embodiment 4 of the invention. FIG. 11 is a sectional view showing a part the winding structure of induction electric apparatus in FIG. 10 taken along the line XI—XI. Note that description of features, operations and advantages of this Embodiment that are the same as those in the foregoing Embodiment 1 is omitted herein.

The inner vertical guide cooling passage 18 parallel to the inner vertical cooling passage 8 is formed by splitting the horizontal cooling passage 5 and the inner vertical cooling passage 8 into two parts with the inner flow passage adjusting guide plate 14. This is done by placing the inner flow passage adjusting guide plate 14 along the whole circumference.

This Embodiment 4 provides an arrangement in which, in terms of the foregoing Embodiment 1 and Embodiment 2, only the outer flow passage adjusting guide plate 13 is placed. The flow velocity in each horizontal flow passage 5 becomes greater as the cross sectional area becomes smaller further in along the radius, while the flow velocity becomes slower as the cross sectional area becomes larger further out along the radius. Therefore, the flow rate equalizing effect of the cooling flow in each horizontal cooling passage 5 within each cooling block achieved by mounting the flow passage adjusting guide plate is larger with the inner flow passage adjusting guide plate 14 than with the outer flow passage adjusting guide plate 13. This means that the flow rate equalizing effect of the cooling flow within each horizontal cooling passage 5 is larger in this Embodiment 4 than in Embodiment 3. In addition, as compared with the foregoing Embodiment 1, increase in the manufacturing cost can be restrained as the number of guide plates used is small. Flow rate of the cooling flow in each horizontal cooling passage 5 within each cooling block downstream of the inner flow passage adjusting guide plate 14 can be evened and uniformed for each passage through the same operation as in the foregoing Embodiment 1.

The same advantages achieved in the foregoing Embodiment 1 within each cooling block downstream of the cooling flow of the inner flow passage adjusting guide plate 14 can be also achieved in this Embodiment 4.

Embodiment 5

Figure 12:
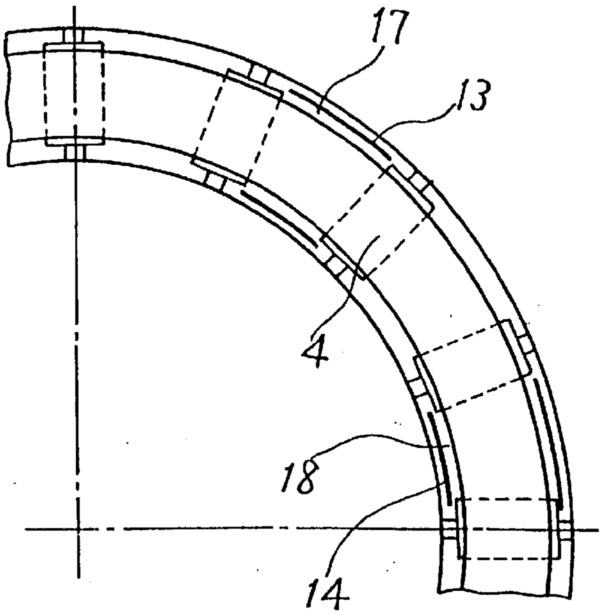
FIG. 12 is a plan view of a winding structure of induction electric apparatus according to Embodiment 5 of the present invention.

FIG. 12 is a plan view showing a part of the winding structure of induction electric apparatus according to Embodiment 5 of the present invention. Note that description of features, operations and advantages of this Embodiment that are the same as those in the foregoing Embodiment 1 is omitted herein.

As shown in FIG. 12, the horizontal cooling passage 5 and the outer vertical cooling passage 9 are split into two parts by the outer flow passage adjusting guide plate 13 to form the outer vertical guide cooling passage 17 parallel to the outer vertical cooling passage 9. The horizontal cooling passage 5 and the inner vertical cooling passage 8 are split into two parts by the inner flow passage adjusting guide plate 14 to form the inner vertical guide cooling passage 18 parallel to the inner vertical cooling passage 8. This arrangement is achieved by placing the outer flow passage adjusting guide plate 13 and the inner flow passage adjusting guide plate 14 partially in one section of the circumference, as shown in FIG. 12. In the plan view of FIG. 12, the outer flow passage adjusting guide plate 13 and the inner flow passage adjusting guide plate 14 are placed opposite to each other in one section of the circumference.

Depending on the situation, however, the outer flow passage adjusting guide plate 13 and the inner flow passage adjusting guide plate 14 are not always necessary to be disposed opposite to each other like in the plan view of FIG. 12. But it is also preferable that they are placed alternately by shifting one of them along the circumference by one horizontal spacer spacing.

This Embodiment 5 is an arrangement in which, in terms of the foregoing Embodiment 1 and Embodiment 2, the outer flow passage adjusting guide plate 13 and the inner flow passage adjusting guide plate 14 are placed at some parts in some parts along the circumference. As compared with the foregoing Embodiment 1, increase in the manufacturing cost can be restrained as the number of guide plates used is small. Flow rate of the cooling flow in each horizontal cooling passage 5 within each cooling block downstream of the outer flow passage adjusting guide plate 13 and the inner flow passage adjusting guide plate 14 can be made more even through the same operation as in the foregoing Embodiment 1.

The same advantages achieved in the foregoing Embodiment 1 within each cooling block downstream of the cooling flow of the outer flow passage adjusting guide plate 13 and the inner flow passage adjusting guide plate 14 can be also achieved in this Embodiment 5.

Embodiment 6

Figure 13:
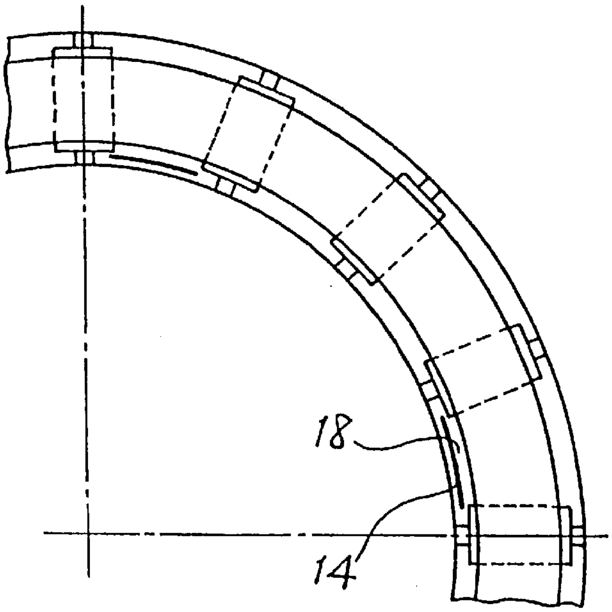
FIG. 13 is a plan view of the winding structure of induction electric apparatus according to Embodiment 6 of the invention.

FIG. 13 is a plan view showing a part of the winding structure of induction electric apparatus according to Embodiment 6 of the present invention. Note that description of features, operations and advantages of this Embodiment that are the same as those in the foregoing Embodiment 4 is omitted herein.

The inner vertical guide cooling passage 18 parallel to the inner vertical cooling passage 8 is formed by splitting the horizontal cooling passage 5 and the inner vertical cooling passage 8 into two parts with the inner flow passage adjusting guide plate 14. This is done by placing the inner flow passage adjusting guide plate 14 partially along the circumference.

This Embodiment 6 of the invention is an arrangement in which, in terms of Embodiment 4 of the invention, the inner flow passage adjusting guide plates 14 are placed in some parts along the circumference. As compared with the foregoing Embodiment 4, increase in the manufacturing cost can be restrained as the number of guide plates used is small. Flow rate of the cooling flow in each horizontal cooling passage 5 within each cooling block downstream of the cooling flow of the inner flow passage adjusting guide plate 14 can be made more even through the same operation as in Embodiment 4.

The same advantage achieved in the foregoing Embodiment 4 within each cooling block downstream of the inner flow passage adjusting guide plate 14 can be also achieved in this Embodiment 6.

In FIG. 13, the inner flow passage adjusting guide plate 14 is placed in some parts along the circumference. However, it is also preferable that the outer flow passage adjusting guide plates 13 are placed is some parts along the circumference.

Embodiment 7

Figure 14:
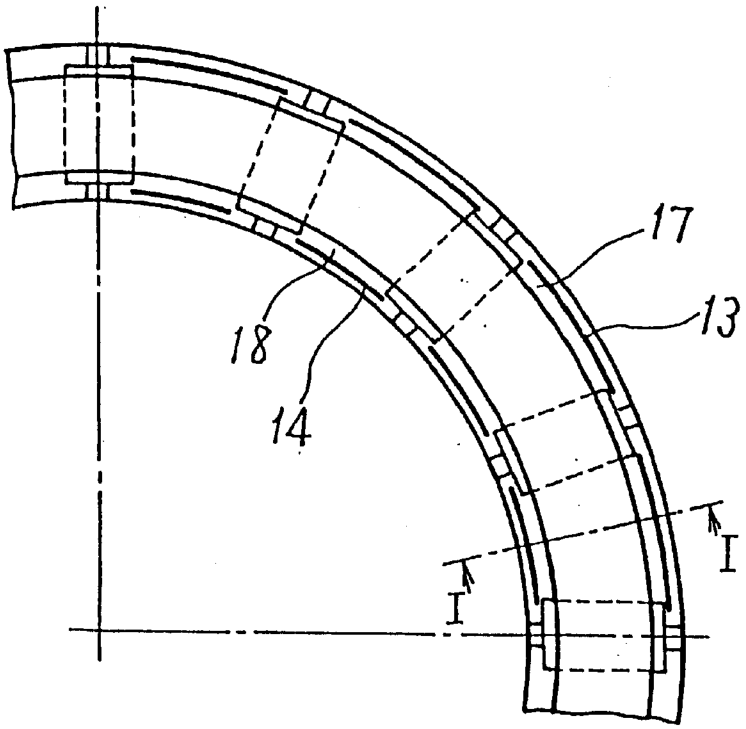
FIG. 14 is a plan view of a winding structure of induction electric apparatus according to Embodiment 7 of the invention.
Figure 15:
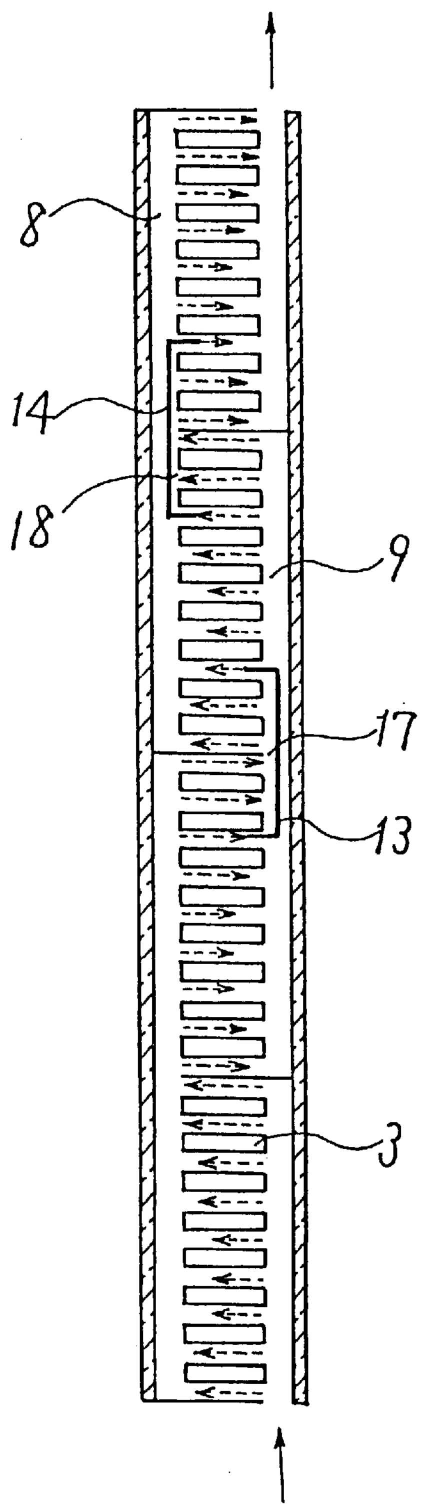
FIG. 15 is a sectional view showing the winding structure of induction electric apparatus in FIG. 14 taken along the line XV—XV.

FIG. 14 is a plan view showing a part of the winding structure of induction electric apparatus according to Embodiment 7 of the present invention. FIG. 15 is a sectional view showing the winding structure of induction electric apparatus in FIG. 14 taken along the line XV–XV. Note that description of features, operations and advantages of this Embodiment that are the same as those in the foregoing Embodiment 1 is omitted herein.

The outer flow passage adjusting guide plate 13 and the inner flow passage adjusting guide plate 14 are placed at some parts in the axial direction of the insulating cylinder of the disc winding 3, and along the entire circumference in particular downstream of the axial insulating cylinder cooling flow. This is done by splitting the horizontal cooling passage 5 and the outer vertical cooling passage 9 in some parts downstream of the axial insulating cylinder cooling flow into two parts with the outer flow passage adjusting guide plate 13, thereby forming the outer vertical guide cooling passage 17 parallel to the outer vertical cooling passage 9. In addition, by splitting the horizontal cooling passage 5 and the inner vertical cooling passage 8 in some parts downstream of the axial insulating cylinder cooling flow into two parts with the inner flow passage adjusting guide plate 14, the inner vertical guide cooling passage 18 parallel to the inner vertical cooling passage 8 is formed.

This Embodiment 7 is an arrangement in which, in terms of Embodiment 1 and Embodiment 2, the outer flow passage adjusting guide plate 13 and the inner flow passage adjusting guide plate 14 are placed at some parts in the axial direction of the disc winding 3. As the temperature of the cooling fluid rises higher downstream of the axial insulating cylinder cooling flow, the temperature of the disc winding 3 becomes higher as well further downstream of the axial insulating cylinder cooling flow. Therefore, the disc winding 3 of the highest temperature will be located near the inlet of the cooling flow in the cooling block downstream of the axial insulating cylinder cooling flow. By the same operation as in Embodiment 1, the arrangement in this Embodiment 7 can make more even the flow rate of the cooling flow only in the horizontal cooling passages 5 within each cooling block that contains the disc winding 3 of either the highest temperature or the disc winding 3 of higher temperature than average. In addition, as compared with the foregoing Embodiment 1, increase in the manufacturing cost can be restrained as the number of guide plates used is small.

The same advantages achieved in the foregoing Embodiment 1 of the invention at each cooling block downstream of the cooling flow of the outer flow passage adjusting guide plate 13 and the inner flow passage adjusting guide plate 14 can be also achieved in this Embodiment 2.

Note that, although both the outer flow passage adjusting guide plate 13 and the inner flow passage adjusting guide plate 14 are disposed in this Embodiment 7, it is also preferable to dispose just one of these guide plates.

Embodiment 8

Figure 16:
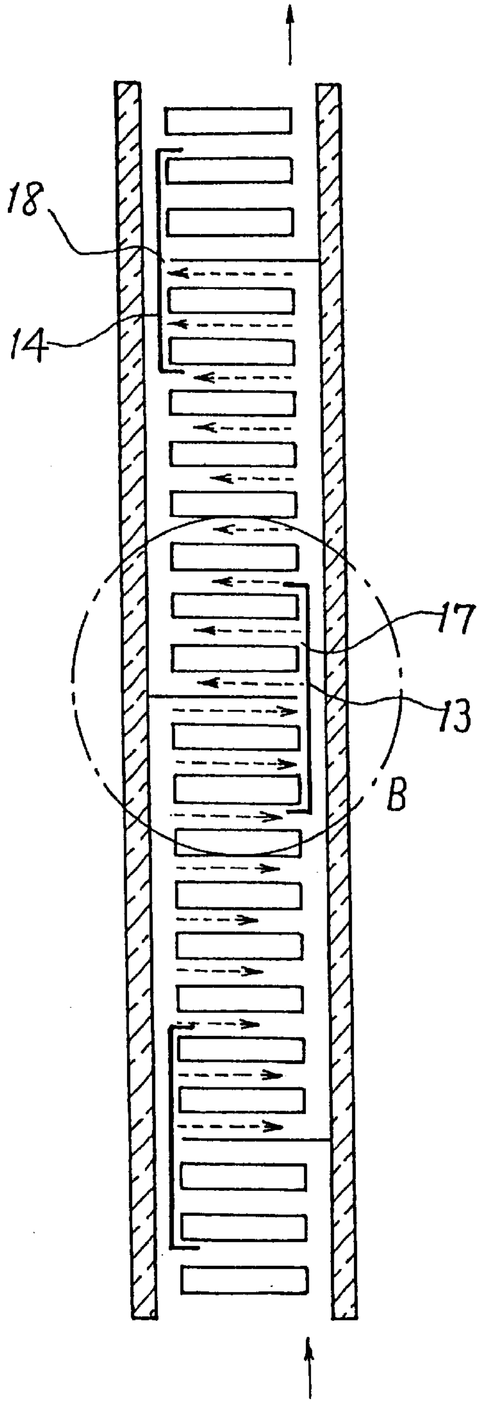
FIG. 16 is a sectional view of a winding structure of induction electric apparatus according to Embodiment 8 of the invention.

FIG. 16 shows a sectional view of the winding structure of induction electric apparatus according to Embodiment 8 of the invention. FIGS. 17, 18, 19 and 20 are sectional views showing details of several modifications of a part B in FIG. 16. Note that description of features, operations and advantages of this Embodiment that are the same as those in the foregoing Embodiment 1 is omitted herein.

Figure 17:
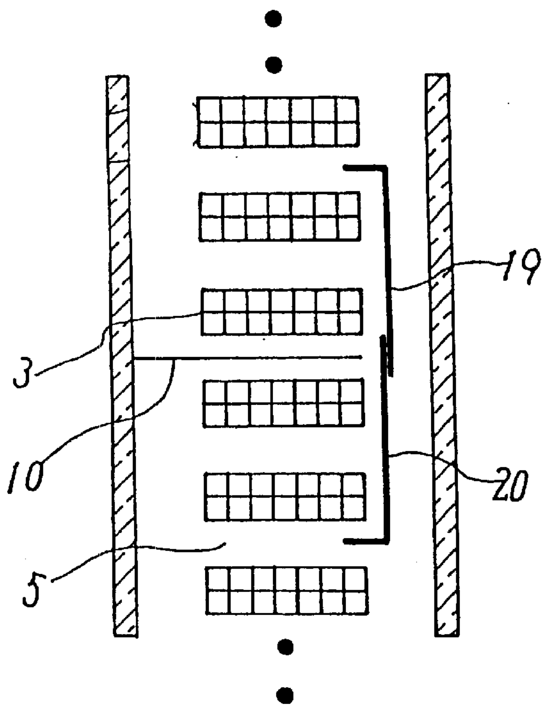
FIG. 17 is a sectional view in detail showing a variation of a part B in FIG. 16.

In FIG. 17, the outer flow passage adjusting guide plate 13 and the inner flow passage adjusting guide plate 14 are divided into two members, that is, one member upstream of the cooling flow and another downstream of the cooling flow. An end of the upstream guide plate 20 that is bent towards (faced towards) the disc winding 3 is placed in the horizontal cooling passage 5 formed by the space between the disc windings 3 along either the whole or part of the circumference in such a manner as to surround the multiple disc windings 3 placed upstream of the axial insulating cylinder cooling flow of the blocking plate 10. Further, an end of the downstream guide plate 19 that is bent towards (faced towards) the disc winding 3 is placed in the horizontal cooling passage 5 formed by the space between the disc windings 3 along either the whole or part of the circumference in such a manner as to surround the plural disc windings 3 placed downstream of the axial insulating cylinder cooling flow of the blocking plate 10.

Figure 18:
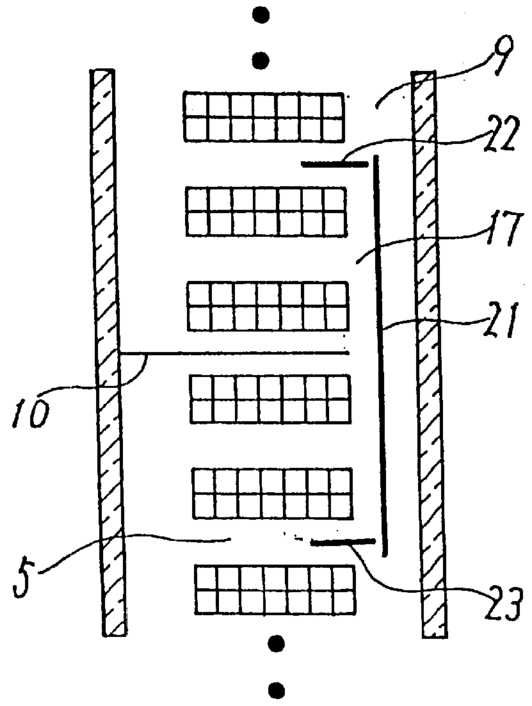
FIG. 18 is a sectional view in detail showing another variation of the part B in FIG. 16.
Figure 19:
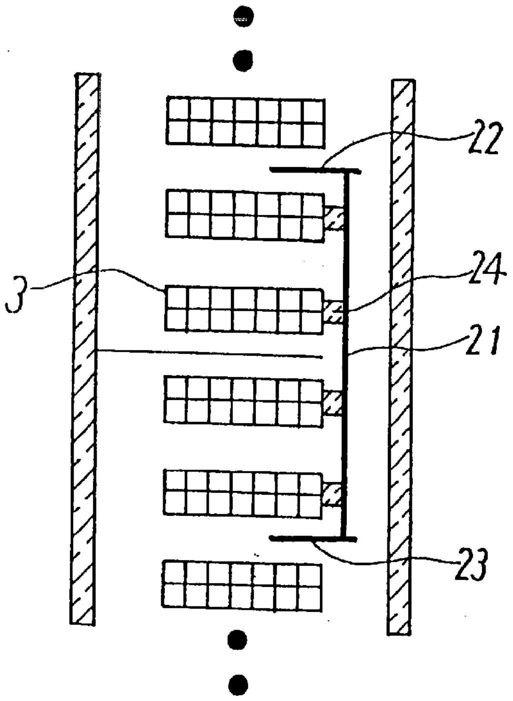
FIG. 19 is a sectional view in detail showing of a further variation of the part B in FIG. 16.
Figure 20:
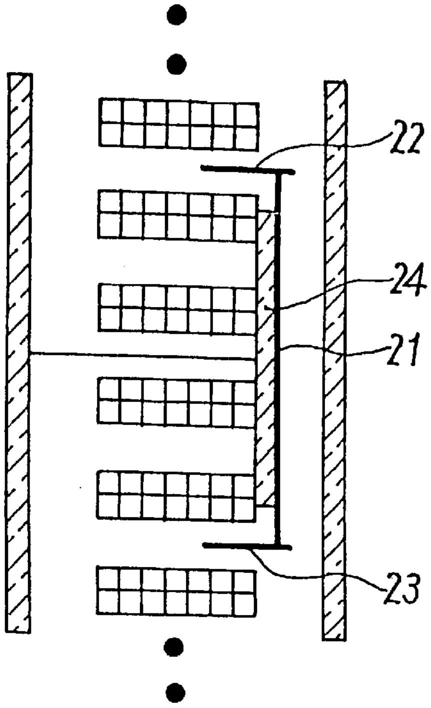
FIG. 20 is a sectional view in detail showing a still further variation of part B in FIG. 16.

In addition, in FIGS. 18, 19 and 20, the outer flow passage adjusting guide plate 13 and the inner flow passage adjusting guide plate 14 are divided into three members, upstream member, central member, and downstream member. An end of the upstream guide plate 23 is faced towards the disc winding 3, and is placed in the horizontal cooling passage 5 formed by the space between the disc windings 3 along either the whole or part of the circumference, in such a manner as to surround the plural disc windings 3 placed upstream of the axial insulating cylinder cooling flow of the blocking plate 10 with the upstream guide plate 23 and the blocking plate 10. On the other hand, an end of the downstream guide plate 22 is faced towards the disc winding 3, and is placed in the horizontal cooling passage 5 formed by the space between the disc windings 3 along either the whole or part of the circumference, in such a manner as to surround the plural disc windings 3 placed downstream of the axial insulating cylinder cooling flow of the blocking plate 10 with the downstream guide plate 22 and the blocking plate 10. The central guide plate 21 is placed either along the whole or part of the circumference of the vertical cooling passage 9 in such a manner as to maintain a certain distance to the disc winding 3. Thus, the outer vertical guide cooling passage 17 and the inner vertical guide cooling passage 18 are formed. In the fitting arrangement shown in FIGS. 19 and 20, the outer vertical guide cooling passage 17 and the inner vertical guide cooling passage 18 are formed by placing a guide plate support spacer 24 between the disc winding 3 and the central guide plate 21. In FIG. 19, plural guide plate support spacers 24 are disposed for each disc winding 3, while in FIG. 20 one guide plate support spacer 24 is commonly disposed in vertical direction across the plural disc windings 3.

This Embodiment 8 is an arrangement in which, in terms of Embodiment 1 and Embodiment 2, the outer flow passage adjusting guide plate 13 is divided into the upstream guide plate 20 and the downstream guide plate 19. Alternatively, the outer flow passage adjusting guide plate 13 is divided into the central guide plate 21, the upstream guide plate 23, and the downstream guide plate 22. Further, the inner flow passage adjusting guide plate 14 is also divided in the same manner. As compared with the foregoing Embodiment 1, workability is improved by dividing the guide plates. This restrains increase in manufacturing cost. Furthermore, by placing the guide plate support spacer 24, not only the fitting precision is increased but also deformation of the guide plate is prevented.

The same advantage achieved in the foregoing Embodiment 4 with respect to each cooling block downstream of the guide plate can be also achieved in this Embodiment 8.

Embodiment 9

Figure 21:
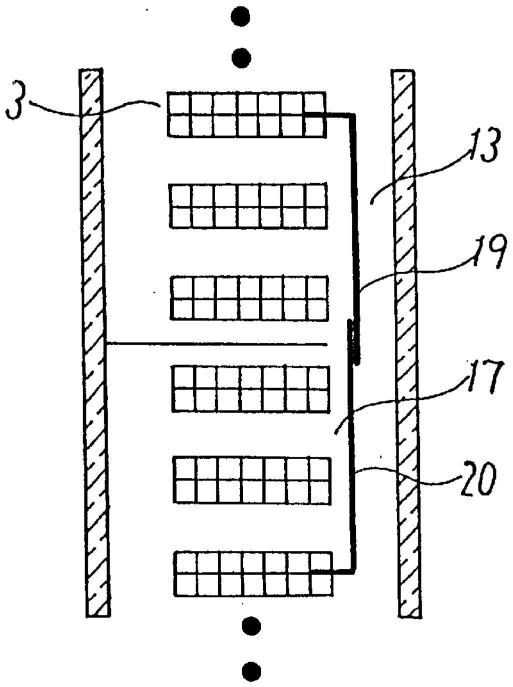
FIG. 21 is a sectional view of a winding structure of induction electric apparatus according to Embodiment 9 of the invention, and is a sectional view in detail showing a variation of the part B in FIG. 16.

FIG. 21 is a sectional view of the winding structure of induction electric apparatus according to Embodiment 9 of the invention showing the details of a further modification of the part B in FIG. 16. Note that description of features, operations and advantages of this Embodiment that are the same as those in the foregoing Embodiment 2 and Embodiment 8 is omitted herein.

The outer vertical guide cooling passage 17 and the inner vertical guide cooling passage 18 are formed by placing the ends of the upstream guide plate 20 and the downstream guide plate 19 of the outer flow passage adjusting guide plate 13 and the inner flow passage adjusting guide plate 14 on the side face of the disc winding 3 along either the whole or part of the circumference.

This Embodiment 9 is an arrangement in which, in terms of the foregoing Embodiment 1, Embodiment 2 and Embodiment 8, the ends of the upstream guide plate 20 and the downstream guide plate 19 of the outer flow passage adjusting guide plate 13 and the inner flow passage adjusting guide plate 14 are placed on the side face (peripheral side face) of the disc winding 3 along either the whole or part of the circumference. Each disc winding 3 is constructed by conductor wires covered with insulators. This guide plate fitting arrangement is simplified by inserting the ends of the guide plate between the conductor wires. As compared with the foregoing Embodiment 1, workability in fitting the guide plate is improved, and increase in manufacturing cost is restrained.

The same advantage achieved in the foregoing Embodiment 4 with respect to each cooling block downstream of the guide plate can be also achieved in this Embodiment 9.

An example, in which the outer flow passage adjusting guide plate 13 and the inner flow passage adjusting guide plate 14 are divided into the upstream guide plate 20 and the downstream guide plate 19, has been described above. However, fitting of the guide plates is simplified in an arrangement in which the outer flow passage adjusting guide plate 13 and the inner flow passage adjusting guide plate 14 are not divided, and an end portion upstream of the cooling flow and an end portion downstream of the cooling flow bent towards the disc windings 3 are inserted in between the conductor wires. As compared with the foregoing Embodiment 1, workability in fitting the guide plates is improved, and increase in manufacturing cost is restrained.

Furthermore, fitting of the guide plate is also simplified in an arrangement in which the outer flow passage adjusting guide plate 13 and the inner flow passage adjusting guide plate 14 are divided into three parts, that is, into the. central guide plate 21, the upstream guide plate 23 and the downstream guide plate 22. In this fitting arrangement, the ends of the upstream guide plate 23 and the downstream guide plate 22 are inserted in between the conductor wires. As compared with the foregoing Embodiment 1, workability in fitting the guide plate is improved, and increase in manufacturing cost is restrained.

Embodiment 10

Figure 22:
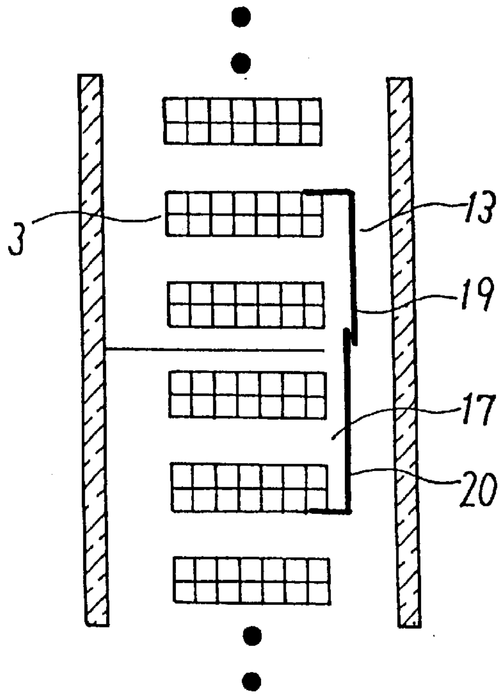
FIG. 22 is a sectional view of a winding structure of induction electric apparatus according to Embodiment 10 of the invention, and is a sectional view in detail showing a variation of the part B in FIG. 16.

FIG. 22 is a sectional view of the winding structure of induction electric apparatus according to Embodiment 10 of the invention showing the details of a further modification of the part B in FIG. 16. Note that description of features, operations and advantages of this Embodiment that are the same as those in the foregoing Embodiment 2 and Embodiment 8 is omitted herein.

The outer vertical guide cooling passage 17 and the inner vertical guide cooling passage 18 are formed by placing the upstream guide plate 20 of the outer flow passage adjusting guide plate 13 and the inner flow passage adjusting guide plate 14 on the side face of the disc winding 3 upstream of the cooling flow, and by placing an end of the downstream guide plate 19 on the side face of the disc winding 3 downstream of the cooling flow, along either the whole or part of the circumference.

This Embodiment 10 of the invention is an arrangement in which, in terms of the foregoing Embodiment 1, Embodiment 2, and Embodiment 8, an end of the upstream guide plate 20 of the outer flow passage adjusting guide plate 13 and the inner flow passage adjusting guide plate 14 is placed on the side face of the disc winding 3 upstream of the cooling flow, and an end of the downstream guide plate 19 is placed on the side face of the disc winding 3 downstream of the cooling flow, along either the whole or part of the circumference. As compared with the foregoing Embodiment 1 of the invention, fitting arrangement of the guide plate is simplified, improving workability in fitting the guide plate, which, in turn, restrains increase in manufacturing cost.

The same advantage achieved in the foregoing Embodiment 4 with respect to each cooling block downstream of the guide plate can be also achieved in this Embodiment 10.

An example, in which the outer flow passage adjusting guide plate 13 and the inner flow passage adjusting guide plate 14 are divided into the upstream guide plate 20 and the downstream guide plate 19, has been described above. However, it is also preferable that the outer flow passage adjusting guide plate 13 and the inner flow passage adjusting guide plate 14 are not divided, and an end portion upstream of the cooling flow and an end portion downstream of the cooling flow bent towards the disc winding 3 are disposed as well.

Furthermore, it is also preferable that the outer flow passage adjusting guide plate 13 and the inner flow passage adjusting guide plate 14 are divided into the three parts, that is, the central guide plate 21, the upstream guide plate 23 and the downstream guide plate 22, and the end portions of the upstream guide plate 23 and the downstream guide plate 22 are disposed as well.

Embodiment 11

Figure 23:
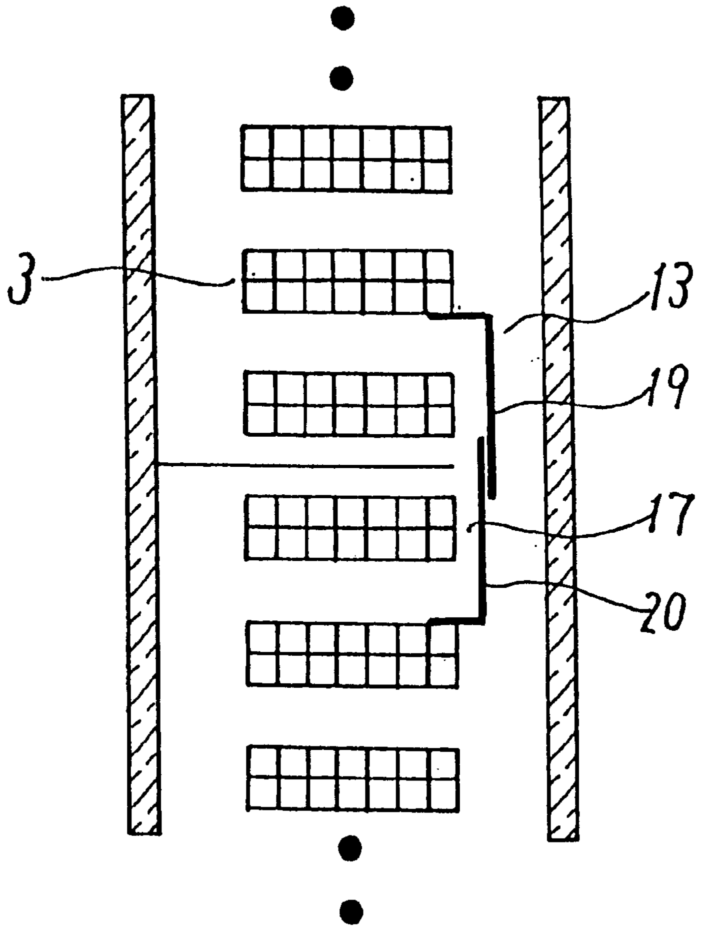
FIG. 23 is a sectional view of a winding structure of induction electric apparatus according to Embodiment 11 of the invention, and is a sectional view in detail showing a variation of the part B in FIG. 16.

FIG. 23 is a sectional view of the winding structure of induction electric apparatus according to Embodiment 11 of the invention showing the details of a further modification of the part B in FIG. 16. Note that description of features, operations and advantages of this Embodiment that are the same as those in the foregoing Embodiment 2 and Embodiment 8 is omitted herein.

The outer vertical guide cooling passage 17 and the inner vertical guide cooling passage 18 are formed by placing the upstream guide plate 20 of the outer flow passage adjusting guide plate 13 and the inner flow passage adjusting guide plate 14 on the side face of the disc windings 3 downstream of the cooling flow, and by placing an end of the downstream guide plate 19 on the side face of the disc winding 3 upstream of the cooling flow, along either the whole or part of the circumference.

This Embodiment 11 is an arrangement in which, in terms of the foregoing Embodiment 1, Embodiment 2 and Embodiment 8, the end of the upstream guide plate 20 of the outer flow passage adjusting guide plate 13 and the inner flow passage adjusting guide plate 14 is placed on the side face of the disc windings 3 downstream of the cooling flow, and the end of the downstream guide plate 19 is placed on the side face of the disc winding 3 upstream of the cooling flow, along either the whole or part of the circumference. As compared with the foregoing Embodiment 1, fitting arrangement of the guide plate is simplified, improving workability in fitting the guide plate, which, in turn, increase in manufacturing cost is restrained. The same advantage achieved by the foregoing Embodiment 1 with respect to each cooling block downstream of the cooling flow of the guide plate can be achieved in this Embodiment 11.

An example, in which the outer flow passage adjusting guide plate 13 and the inner flow passage adjusting guide plate 14 are divided into the upstream guide plate 20 and the downstream guide plate 19, has been described above. However, it is also preferable that the outer flow passage adjusting guide plate 13 and the inner flow passage adjusting guide plate 14 are not divided, and an end portion upstream of the cooling flow and an end portion downstream of the cooling flow bent towards the disc winding 3 are disposed as well.

Furthermore, it is also preferable that the outer flow passage adjusting guide plate 13 and the inner flow passage adjusting guide plate 14 are divided into the three parts, that is, the central guide plate 21, the upstream guide plate 23 and the downstream guide plate 22, and the end portions of the upstream guide plate 23 and the downstream guide plate 22 are disposed as well.

Embodiment 12

Figure 24:
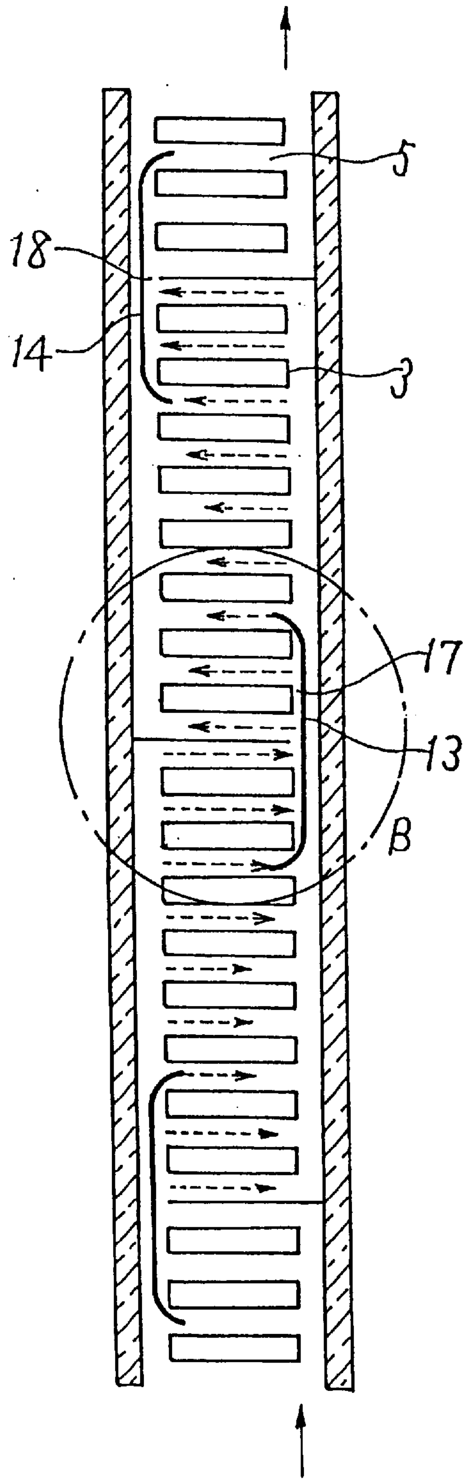
FIG. 24 is a sectional view of a winding structure of induction electric apparatus according to Embodiment 12 of the invention, and is a variation of the sectional view taken along the line II—II in FIG. 1.

FIG. 24 is a sectional view of the winding structure of induction electric apparatus according to Embodiment 12 of the present invention, and is an example of a modification of the sectional view taken along the line II—II in FIG. 1. Note that description of features, operations and advantages of this Embodiment that are the same as those in the foregoing Embodiment 1, Embodiment 2 and Embodiment 8 is omitted herein.

The end part upstream of the cooling flow of the outer flow passage adjusting guide plate 13 and the inner flow passage adjusting guide plate 14 is bent towards the disc windings 3 so that the cross section of the bent part forms a circular arc, and the end part downstream of the cooling flow is bent towards the disc winding 3 so that the cross section of the bent part forms a circular arc. These bent parts are placed along either the whole or part of the circumference of the horizontal cooling passages 5 formed by the spaces between the disc windings 3, thus the outer vertical guide cooling passage 17 and the inner-vertical guide cooling passage 18 being formed.

In other words, the bent portions faced towards the disc winding of the flow passage adjusting guide plates are curved so as to reduce the resistance to the cooling flow.

This Embodiment 12 of the invention is an arrangement in which, in terms of the foregoing Embodiment 1, the end part upstream of the cooling flow and the end part downstream of the cooling flow of the outer flow passage adjusting guide plate 13 and the inner flow passage adjusting guide plate 14 are bent so that the bent cross section forms a circular arc. As compared with the foregoing Embodiment 1, resistance to the flow of the cooling fluid passing through the inner vertical cooling passage 8 and the outer vertical cooling passage 9, and the outer vertical guide cooling passage 17 and the inner vertical guide cooling passage 18, is reduced by curving the cross section of the bent portion.

In this Embodiment 12, not only the same advantage achieved by the foregoing Embodiment 1 is achieved but also the resistance to the cooling fluid in each cooling block downstream of the guide plate is reduced.

Described in this Embodiment 12 is an example in which each cross section of the bent portion is curved forming a circular arc for the outer flow passage adjusting guide plate 13 and the inner flow passage adjusting guide plate 14 that are not divided. Note that, in a modification in which the outer flow passage adjusting guide plate 13 and the inner flow passage adjusting guide plate 14 are divided into two parts, the resistance to the flow of the cooling fluid can be reduced in the same manner by bending the end of the upstream guide plate 20 so that the cross section is curved to form a circular arc, and by bending the end of the downstream guide plate 19 so that the cross section is curved to form a circular arc.

Embodiment 13

Figure 25:
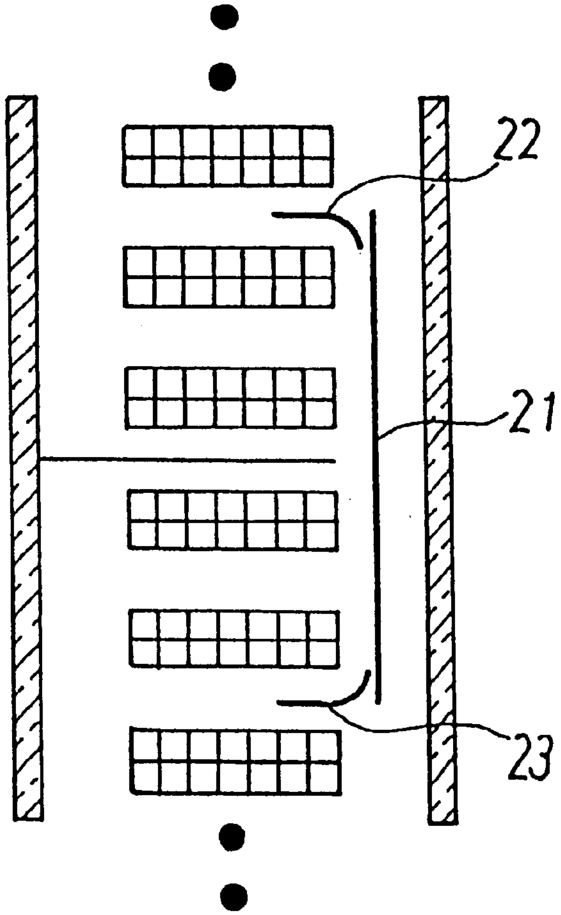
FIG. 25 is a sectional view of a winding structure of induction electric apparatus according to Embodiment 13 of the invention, and is a sectional view in detail showing a variation of a part B in FIG. 24.

Further, FIG. 25 is a sectional view of the winding structure of induction electric apparatus according to Embodiment 13 of the present invention, and is a sectional view showing the details of a modification of the part B in FIG. 24. This arrangement can reduce the resistance to the flow of the cooling liquid in the same manner by dividing the outer flow passage adjusting guide plate 13 and the inner flow passage adjusting guide plate 14 into three parts, that is, into the central guide plate 21, the upstream guide plate 23 and the downstream guide plate 22, and by bending the ends of the upstream guide plate 23 and the downstream guide plate 22 so that they are curved in cross section to form a circular arc. In other words, the bent portions of the upstream guide plate 23 and the downstream guide plate 22 faced towards the disc winding are curved so as to reduce the resistance to the cooling flow.

Embodiment 14

Furthermore, the resistance to the flow of the cooling fluid in each of the winding structure of induction electric apparatus described in FIGS. 21, 22, and 23 can be reduced, by either curving the cross section of each bent part to form a circular arc, or by bending the end portions so that the cross section is curved to form a circular arc.

Figure 26:
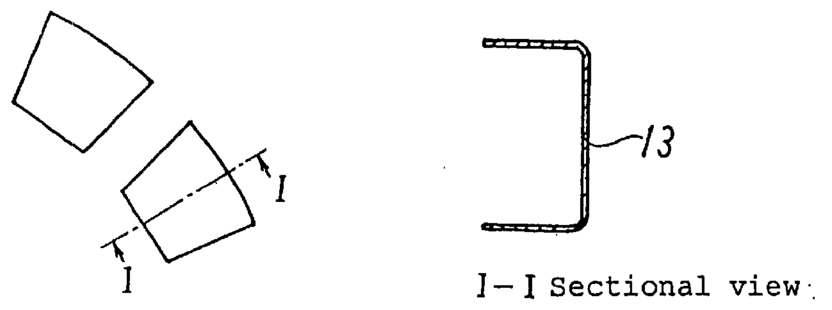
FIG. 26(*a*) a plan view of the flow passage adjusting guide plate used in the invention, and FIG. 26(*b*) also shows a sectional view taken along line XXVI—XXVI of the plan view.
Figure 27:
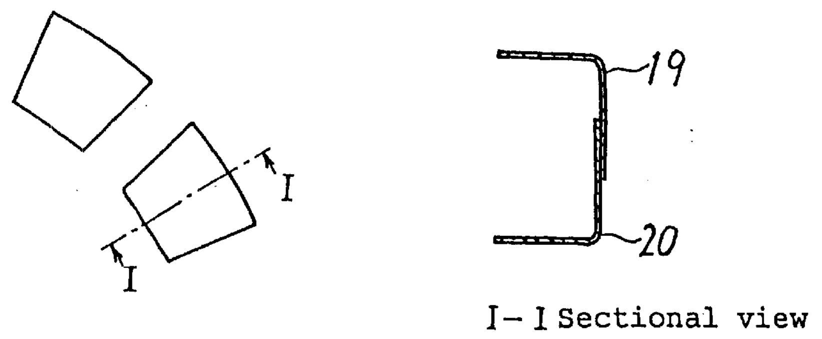
FIG. 27(*a*) is a plan view of another flow passage adjusting guide plate used in the invention, and FIG. 27(*b*) shows a sectional view taken along line XXVII—XXVII of the plan view.
Figure 28:
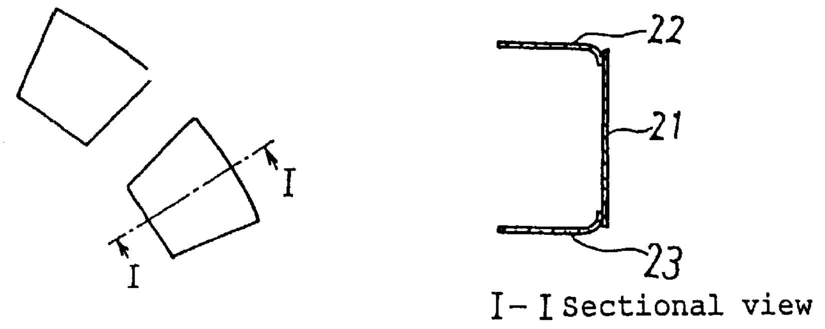
FIG. 28(*a*) is a plan view of a further flow passage adjusting guide plate used in the invention, and FIG. 28(*b*) shows a sectional view taken along line XXVIII—XXVIII of the plan view.

FIGS. 26(*a*), 27(*a*), and 28(*a*) show plan views of the flow passage adjusting guide plate employed in the present invention, and FIGS. 26(*b*), 27(*b*), and 28(*b*) are sectional views of each plan view taken along the lines XXVI—XXVI, XXVII—XXVII, and XXVIII—XXVIII, respectively. These drawings show examples of arrangements in which separate flow passage adjusting guide plates are used between each horizontal spacer 4.

Embodiment 15

Figure 29:
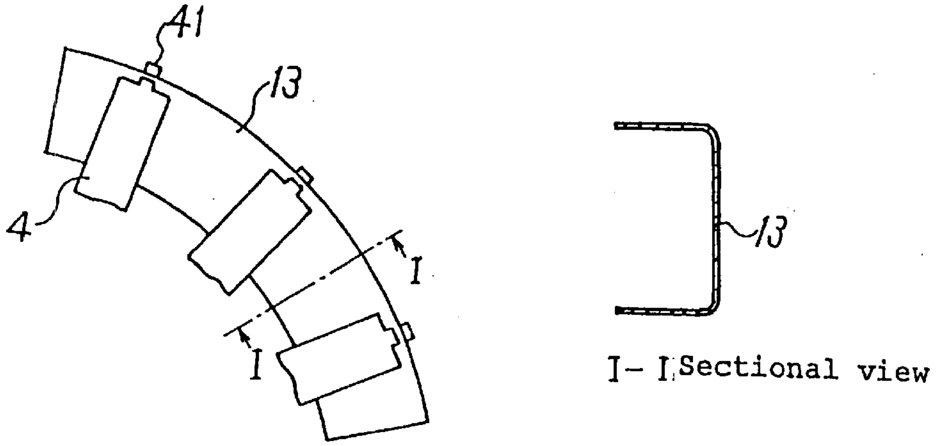
FIG. 29(*a*) is a plan view of a flow passage adjusting guide plate according to Embodiment 15 of the invention and FIG. 29(*b*) is a sectional view taken along the line XXIX—XXIX.

FIG. 29(*a*) shows a plan view and FIG. 29(*b*) shows a sectional view of the flow passage adjusting guide plate according to Embodiment 15 of the present invention taken along the line XXIX—XXIX in the plan view. Note that description of features, operations and advantages of this Embodiment that are the same as those in the foregoing Embodiment 12 and Embodiment 13 is omitted herein.

The outer flow passage adjusting guide plate 13 and the inner flow passage adjusting guide plate 14 are formed into an elongated single plate unified lengthwise so that they may be placed continuously between the horizontal spacers 4 along the circumference of the disc windings 3. The unified single guide plate is placed at the same time along either the whole or part of the circumference of the cooling block to form the outer vertical guide cooling passage 17 and the inner vertical guide cooling passage 18. In FIG. 29, the outer flow passage adjusting guide plate 13 is continuously inserted between each horizontal spacer 4, and a guide plate support vertical spacer 41 disposed in the space between itself and the outer insulating cylinder 2 (not illustrated).

This Embodiment 15 is an arrangement in which, in terms of the foregoing Embodiment 12 and Embodiment, either the outer flow passage adjusting guide plate 13, or the inner flow passage adjusting guide plate 14, is placed at the same time along either the whole or part of the circumference of the cooling block. This reduces number of guide plate parts to be fitted, as well as reducing man-hours required in fitting them.

In this Embodiment 15, not only the fitting of the guide plate becomes easier, but also the same advantages achieved by the foregoing Embodiment 1 with respect to each cooling block downstream of the cooling flow of the guide plate can be achieved as well. the outer flow passage adjusting guide plate 13 and the inner flow passage adjusting guide plate 14 are formed into an elongated single plate unified lengthwise can also be applied to an modification in which the outer flow passage adjusting guide plate 13 and the inner flow passage adjusting guide plate 14 are divided into two or three parts. In addition to reduction in number of guide plate parts to be fitted, man-hours required in fitting them are reduced as well.

Embodiment 16

Figure 30:
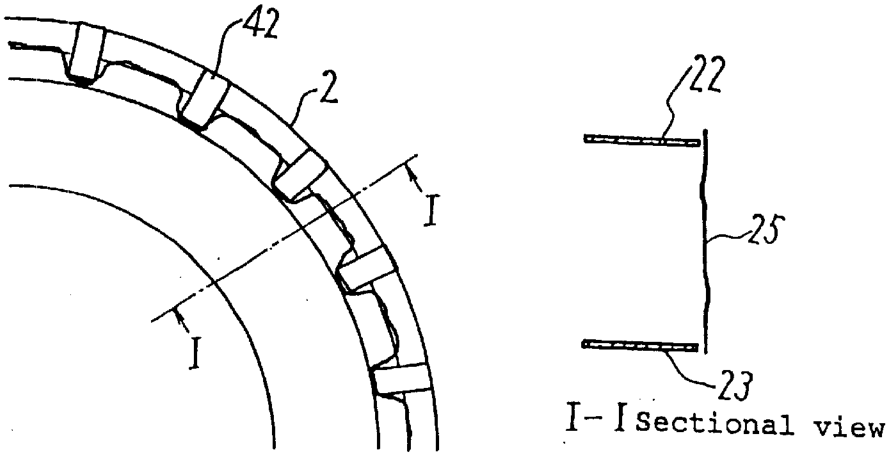
FIG. 30(*a*) is a plan view of the flow passage adjusting guide plate according to Embodiment 16 of the present invention and FIG. 30(*b*) is a sectional view taken along the line XXX—XXX.

FIG. 30(*a*) is a plan view and FIG. 30(*b*) is a sectional view of the flow passage adjusting guide plate according to Embodiment 16 of the present invention taken along the line XXX—XXX in the plan view. Note that description of features, operations and advantages of this Embodiment that are the same as those in the foregoing Embodiment 8, Embodiment 9, Embodiment 10, and Embodiment 11 is omitted herein.

The upstream guide plate 23 and the downstream guide plate 22 are placed at the same time along the whole or part of the circumference of the cooling block. A central guide sheet 25 is formed of a material that can be shaped as desired, for example, an insulating paper such as press board, or an insulating material such as polyester. The central guide sheet is placed at the same time along the whole or part of the circumference of the cooling block, and is fixed by the side face of the disc windings 3 and the guide plate support vertical spacer 42. Thus, the outer vertical guide cooling passage 17 and the inner vertical guide cooling passage 18 are formed.

This Embodiment 16 is an arrangement in which, in terms of the foregoing Embodiment 8, Embodiment 9, Embodiment 10 and Embodiment 11, the central guide sheet 25, which can be shaped as desired, is placed at the same time along the whole or part of the circumference of the cooling block, together with the upstream guide plate 23 and the downstream guide plate 22, which are placed at the same time along either the whole or part of the circumference of the cooling block. This arrangement reduces number of guide plate parts to be fitted, as well as reducing man-hours required in fitting them.

In this Embodiment 16, not only the fitting of the guide plate becomes easier, but also the same advantages achieved by the foregoing Embodiment 1 with respect to each cooling block downstream of the cooling flow of the guide plate can be achieved as well.

Embodiment 17

Figure 31:
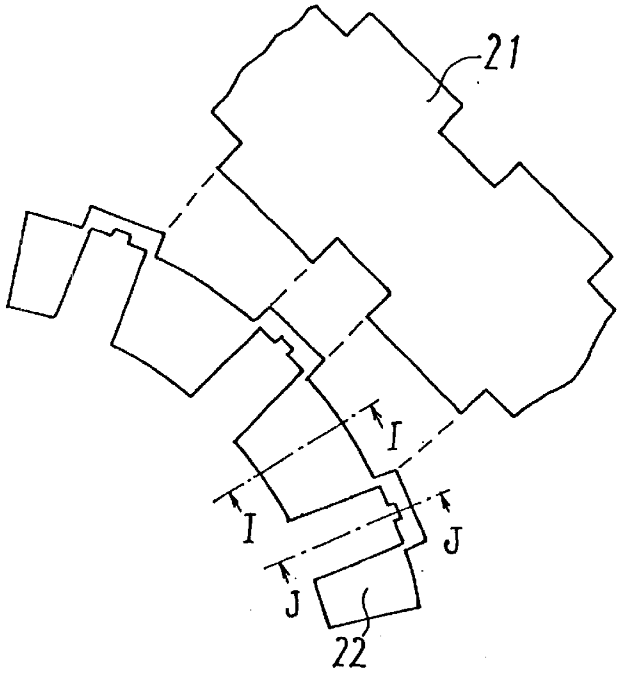
FIG. 31(*a*) is a plan view of the flow passage adjusting guide plate according to Embodiment 17 of the invention, and FIG. 31(*b*) shows a downstream guide plate and a central guide plate in an exploded view.
Figure 32:
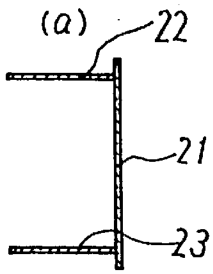
FIGS. 32(*a*) and 32(*b*) are sectional views of an assembled flow passage adjusting guide plate of the invention, and in which FIG. 32(*a*) is a sectional view taken along the line XXXIIa—XXXIIa in FIG. 31(*a*) and FIG. 31(*b*) is a sectional view taken along the line XXXIIb—XXXIIb in FIG. 31(*a*).
Figure 32:
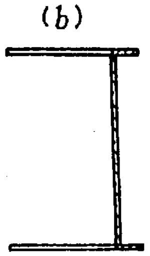
Figure 33:
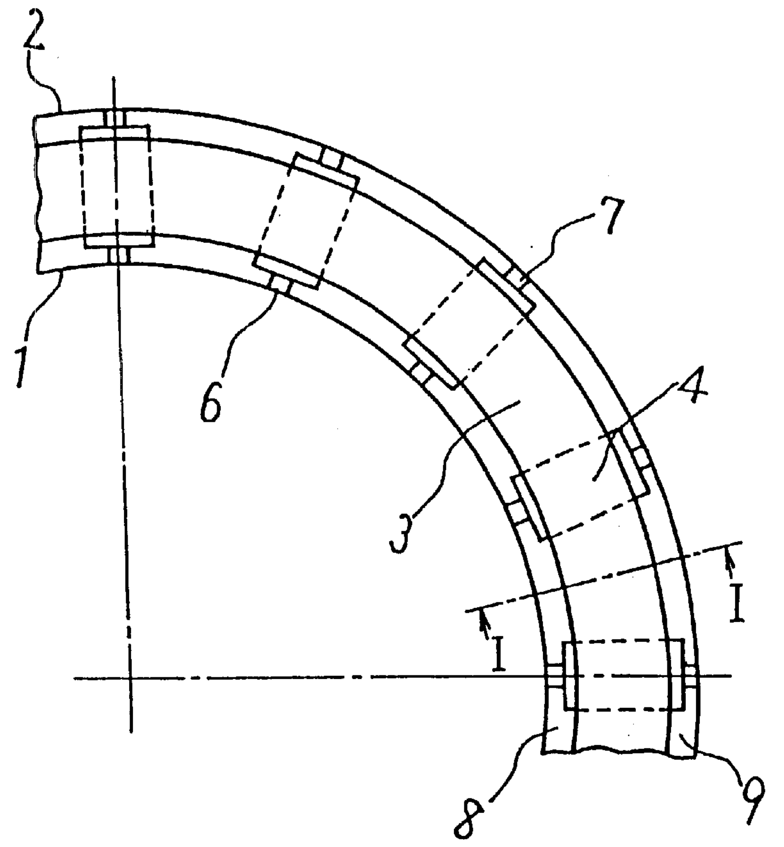
Fig. 33 PRIOR ART
FIG. 33 is a plan view of a winding structure of induction electric apparatus according to a prior art.

FIG. 31(*a*) is a plan view of the flow passage adjusting guide plate according to Embodiment 17 of the present invention, and FIG. 31(*b*) shows an exploded view of the downstream guide plate 22 and the central guide plate 21. FIGS. 32 (*a*) and 32(*b*) are sectional views of the assembled flow passage adjusting guide plate, and FIG. 32(*a*) shows a sectional view taken along the line XXXIIa—XXXIIa in FIG. 31(*a*), while FIG. 32(*b*) shows a sectional view taken along the line XXXIIb—XXXIIb. Note that description of features, operations and advantages of this Embodiment that are the same as those in the foregoing Embodiment 8, Embodiment 9, Embodiment 10, and Embodiment 11 is omitted herein.

The notched upstream guide plate 23 and the notched downstream guide plate 22 are placed at the same time along either the whole or part of the circumference of the cooling block. The notched central guide plate 21 is placed at the same time along either the whole or part of the circumference of the cooling block in such a manner that a projecting portion of the central guide plate 21 coincides with notched parts of the notched upstream guide plate 23 and the notched downstream guide plate 22. Thus, the outer vertical guide cooling passage 17 and the inner vertical guide cooling passage 18 are formed.

This Embodiment 17 is an arrangement in which, in terms of the foregoing Embodiment 8, Embodiment 9, Embodiment 10 and Embodiment 11, the notched parts of the notched upstream guide plate 23 and the notched downstream guide plate 22, placed at the same time along either the whole or part of the circumference of the cooling block, coincides with the projecting portion of the notched central guide plate 21 placed at the same time along either the whole or part of the circumference of the cooling block. By employing such an arrangement, dimensional fitting precision is improved in the upstream and downstream direction of the cooling flow, and the guide plate is prevented from deformation and displacement etc. of caused by disc winding 3 due to vibration, etc.

In this Embodiment 17, not only the fitting of the guide plate becomes easier, but also fitting precision is improved, and besides the same advantages achieved by the foregoing Embodiment 1 with respect to each cooling block downstream of the cooling flow of the guide plate can be achieved as well.

What is claimed is:

1. An inductive winding structure having a relatively uniform cooling fluid flow comprising:

an inner insulating tube;

an outer insulating tube coaxial with the inner insulating tube;

a plurality of disc windings arranged along an axial direction of and between the inner and outer insulating tubes, wherein the disc windings have cooling passages transverse to the axial direction, between each adjacent pair of the disc windings, the disc windings define an inner cooling passage along the axial direction between an inner peripheral side surface of the disc windings and the inner insulating tube, and the disc windings define an outer cooling passage between an outer peripheral side surface of the disc windings and the outer insulating tube;

alternatingly arranged inner and outer blocking plates respectively extending from the inner and outer insulating tubes, transverse to the axial direction, between respective disc windings and at least partially blocking flow of a cooling fluid in the inner and outer cooling passages, respectively, each pair of inner and outer blocking plates closest to each other defining between them a cooling block including a plurality of the disc windings, a cooling fluid flowing between the inner and outer insulating tubes, into one end of and out of another end of the inner and outer insulating tubes; and an outer flow passage adjusting guide plate located in the outer cooling passage opposite and transverse to one of the inner blocking plates, extending, in a circumferential direction of the inner and outer insulating tubes, along at least part of a plurality of the disc windings, and extending in the axial direction along only parts of the pair of adjacent cooling blocks separated by the inner blocking plate, and having respective ends generally transverse to the axial direction.

2. The inductive winding structure according to claim 1, wherein the ends of the outer flow passage guide plate extend between respective pairs of adjacent disc windings, thereby dividing cooling passages and cooling fluid flow through the passages between the pairs of adjacent disc windings of each of the adjacent cooling blocks into separate cooling fluid flow paths.

3. The inductive winding structure according to claim 1, wherein an equal number of the disc windings in the pair of adjacent cooling blocks are directly opposite the outer flow passage adjusting guide plate.

4. The inductive winding structure according to claim 1, wherein a different number of the disc windings in the pair of adjacent cooling blocks are directly opposite the outer flow passage adjusting guide plate.

5. The inductive winding structure according to claim 1, wherein the outer flow passage adjusting guide plate includes an upstream guide plate and a downstream guide plate overlapping with the upstream guide plate along the axial direction.

6. The inductive winding structure according to claim 1, wherein the outer flow passage adjusting guide plate includes an upstream guide plate, a central guide plate, and a downstream guide plate.

7. The inductive winding structure according to claim 1, wherein the ends of the outer flow passage adjusting guide plate include curved portions for reducing cooling fluid flow resistance.

8. The inductive winding structure according to claim 1, wherein the ends of the outer flow passage adjusting guide plate are located on side faces of respective disc windings.

9. The inductive winding structure according to claim 1, wherein a first end of the outer flow passage adjusting guide plate is located on a face of a first of the disc windings, and a second end of the outer flow passage adjusting guide plate located downstream of the flow of the cooling fluid is located on a face of a second of the disc windings.

10. The inductive winding structure according to claim 1, including an inner flow passage adjusting guide plate located in the inner cooling passage opposite and transverse to one of the outer blocking plates, extending, in a circumferential direction of the inner and outer insulating tubes, along at least part of a plurality of the disc windings, and extending in the axial direction along only parts of the pair of adjacent cooling blocks separated by the outer blocking plate.

11. The inductive winding structure according to claim 10, wherein the ends of the inner flow passage guide plate have respective ends generally transverse to the axial direction and extending between respective pairs of adjacent disc windings, thereby dividing cooling passages and cooling fluid flow through the passages between the pairs of adjacent disc windings of each of the adjacent cooling blocks into separate cooling fluid flow paths.

12. The inductive winding structure according to claim 10, wherein an equal number of the disc windings in the two pairs of adjacent cooling blocks are directly opposite the inner and outer flow passage adjusting guide plates.

13. The inductive winding structure according to claim 10, wherein a different number of the disc windings in the pair of adjacent cooling blocks are directly opposite the inner and outer flow passage adjusting guide plates.

14. The inductive winding structure according to claim 10, including a plurality of the outer flow passage adjusting guide plates located in the outer cooling passage at respective circumferential locations of the plurality of layers of disc windings, and a plurality of the inner flow passage adjusting guide plates located in the inner cooling passage at respective circumferential locations of the plurality of disc windings, wherein, along a radial direction of the inner and outer insulating tubes, viewed along the axial direction, a respective outer flow passage adjusting guide plate is directly opposite each of the inner flow passage adjusting guide plates.

15. An inductive winding structure having a relatively uniform cooling fluid flow comprising:

an inner insulating tube;

an outer insulating tube coaxial with the inner insulating tube;

a plurality of disc windings arranged along an axial direction of and between the inner and outer insulating tubes, wherein the disc windings have cooling passages transverse to the axial direction between each adjacent pair of the disc windings, the disc windings define an inner cooling passage along the axial direction between an inner peripheral side surface of the disc windings and the inner insulating tube, and the disc windings define an outer cooling passage between an outer peripheral side surface of the disc windings and the outer insulating tube;

alternatingly arranged inner and outer blocking plates respectively extending from the inner and outer insulating tubes, transverse to the axial direction, between respective disc windings and at least partially blocking flow of a cooling fluid in the inner and outer cooling passages, respectively, each pair of inner and outer blocking plates closest to each other defining between them a cooling block including a plurality of the disc windings, a cooling fluid flowing between the inner and outer insulating tubes, into one end of and out of another end of the inner and outer insulating tubes; and an inner flow passage adjusting guide plate located in the inner cooling passage opposite and transverse to one of the outer blocking plates, extending, in a circumferential direction of the inner and outer insulating tubes, along at least part of a plurality of the disc windings, and extending in the axial direction along only parts of the pair of adjacent cooling blocks separated by the outer blocking plate, and having respective ends generally transverse to the axial direction.

16. The inductive winding structure according to claim 15, wherein the ends of the inner flow passage guide plate extend between respective pairs of adjacent layers of disc windings in the pair, thereby dividing cooling passages and cooling fluid flow through the passages between the pairs of adjacent disc windings of each of the adjacent cooling blocks into separate cooling fluid flow paths.

17. The inductive winding structure according to claim 15, wherein an equal number of the disc windings in the pair of adjacent cooling blocks are directly opposite the inner flow passage adjusting guide plate.

18. The inductive winding structure according to claim 15, wherein a different number of the disc windings in the pair of adjacent cooling blocks are directly opposite the inner flow passage adjusting guide plate.

19. The inductive winding structure according to claim 15, wherein the ends of the inner flow passage adjusting guide plate include curved portions for reducing cooling fluid resistance.

* * * * *